Jan. 8, 1952    A. R. COLLINS ET AL    2,581,942
FUEL BURNING AIR HEATER

Filed July 17, 1946    11 Sheets-Sheet 2

Inventors:
Arthur R. Collins
Frank A. Ryder
Ross D. Randall
By: Hinkle, Horton, Ahlberg, Hausmann & Wupper
Attorneys.

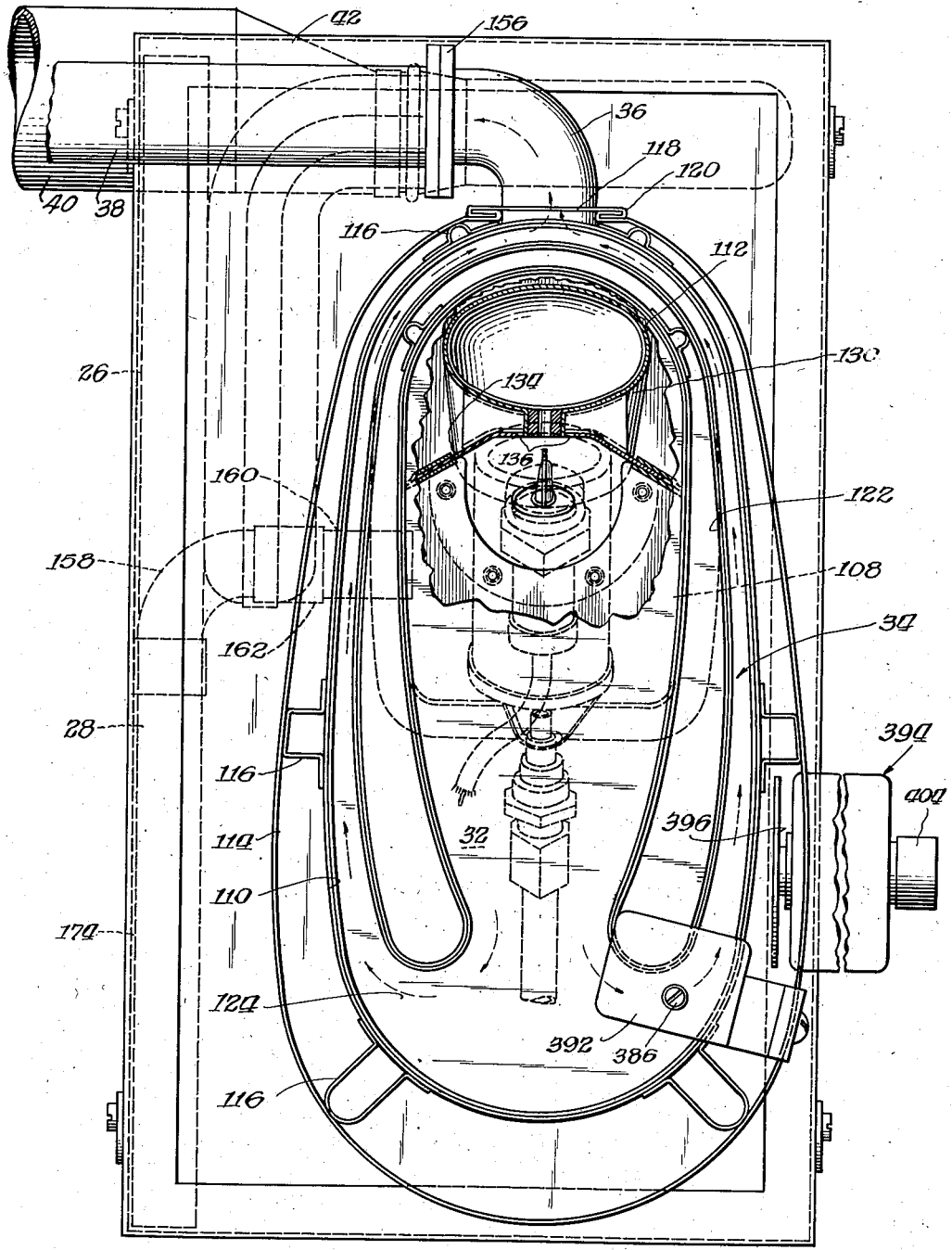

Jan. 8, 1952 A. R. COLLINS ET AL 2,581,942
FUEL BURNING AIR HEATER
Filed July 17, 1946 11 Sheets-Sheet 5
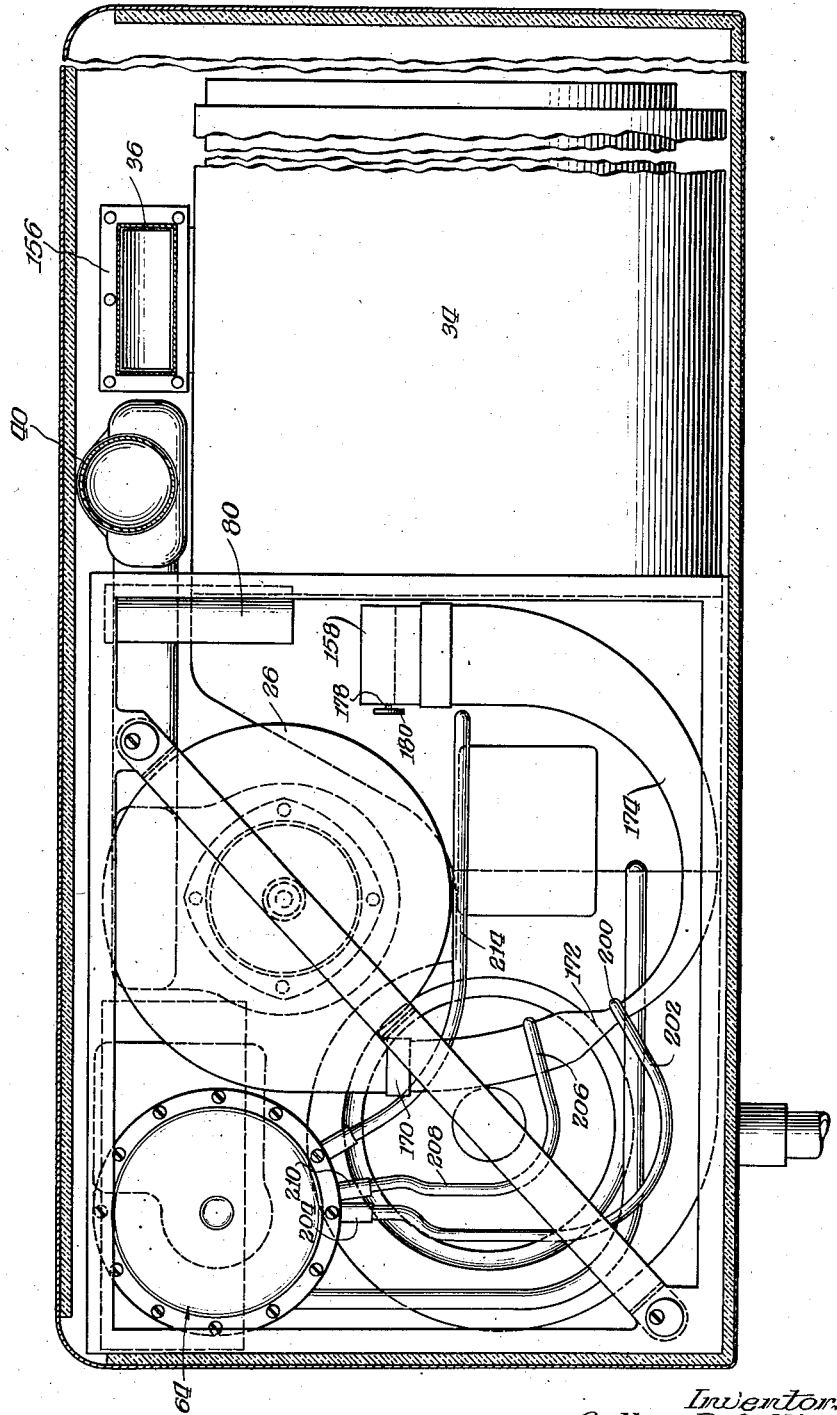
Inventors:
Arthur R. Collins
Frank A. Ryder
Ross D. Randall
By:
Hinkle, Horton, Ahlberg, Hausmann & Kupper
Attorneys.

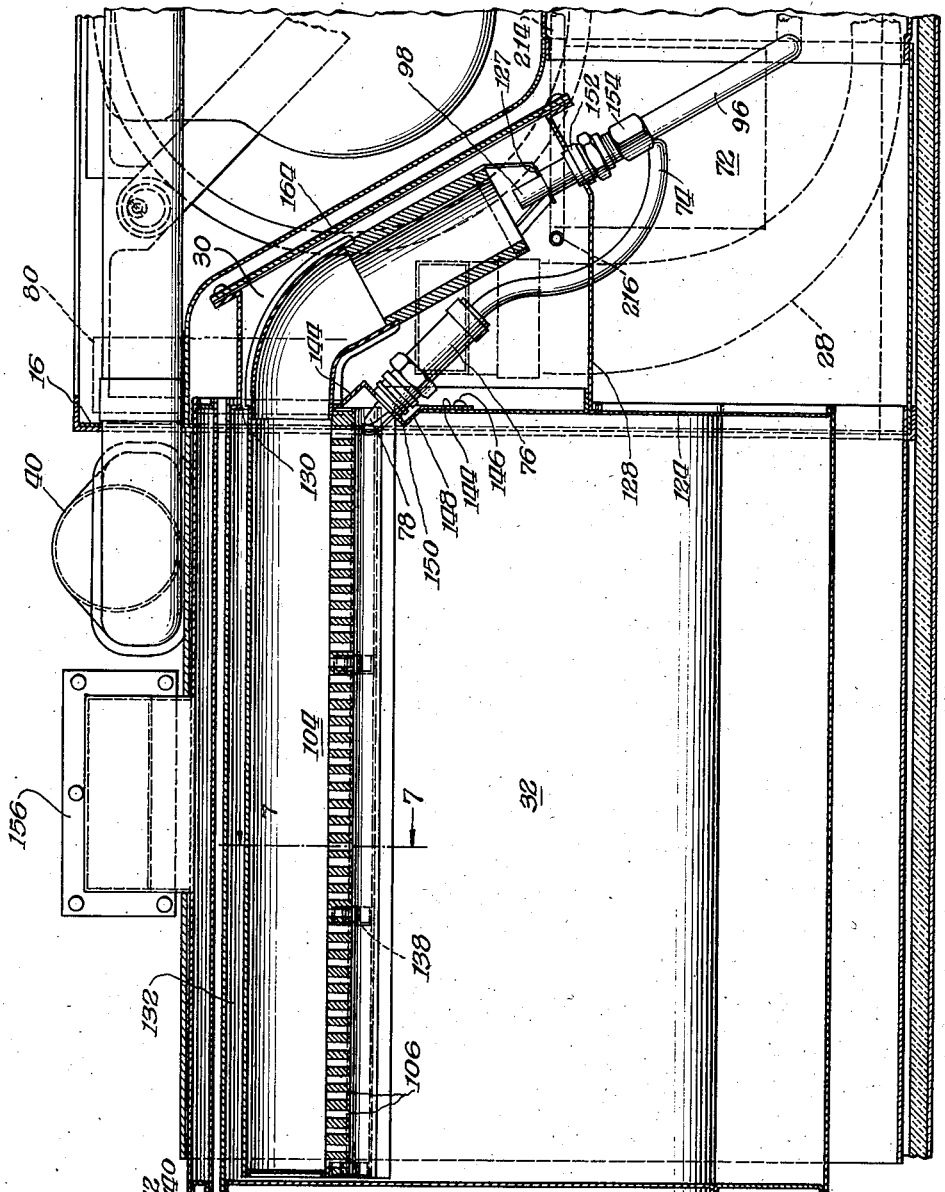

Jan. 8, 1952  A. R. COLLINS ET AL  2,581,942
FUEL BURNING AIR HEATER
Filed July 17, 1946  11 Sheets-Sheet 7
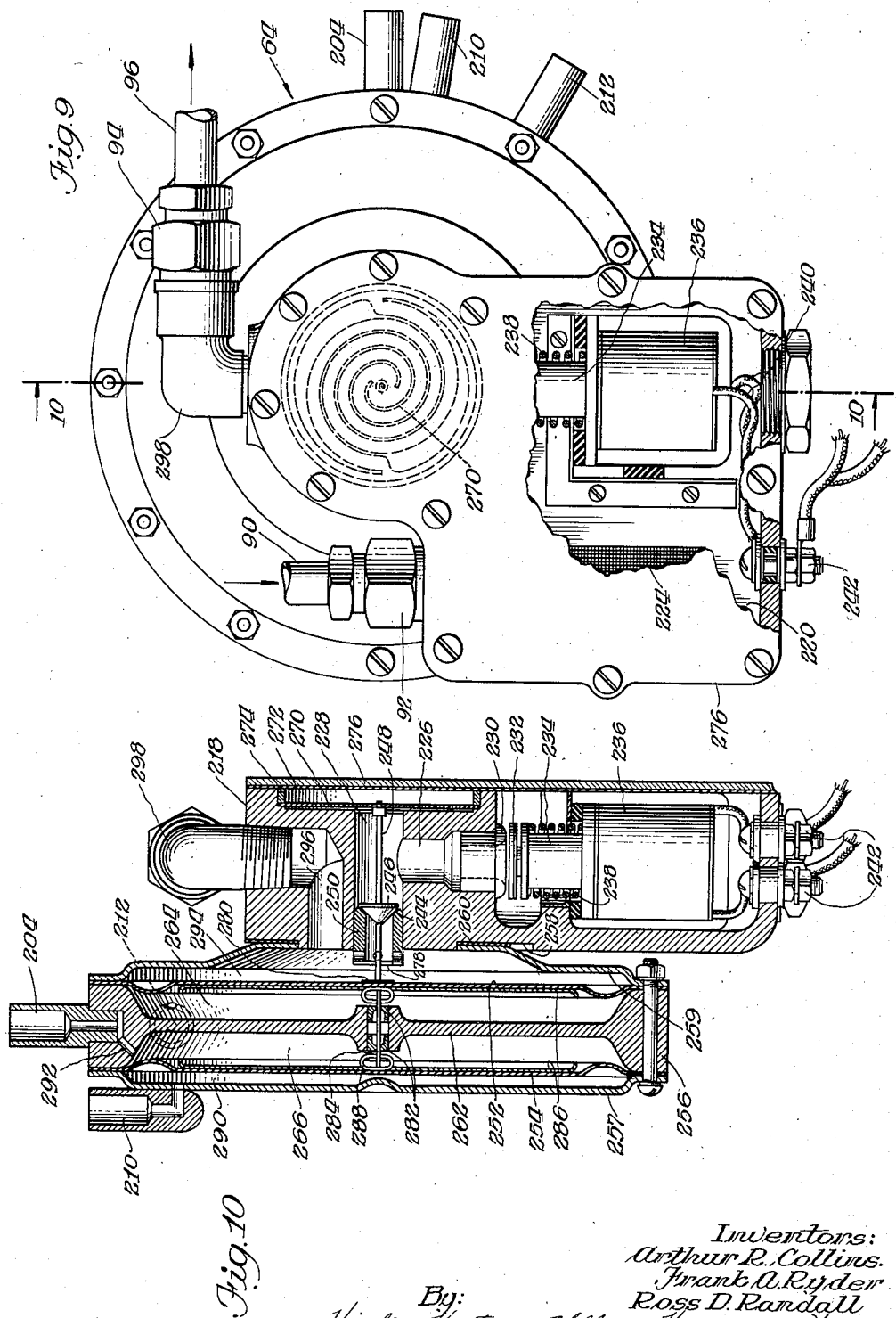
Inventors:
Arthur R. Collins.
Frank A. Ryder.
Ross D. Randall
By: Hinkle, Horton, Ahlberg, Hausmann & Kipper
Attorneys.

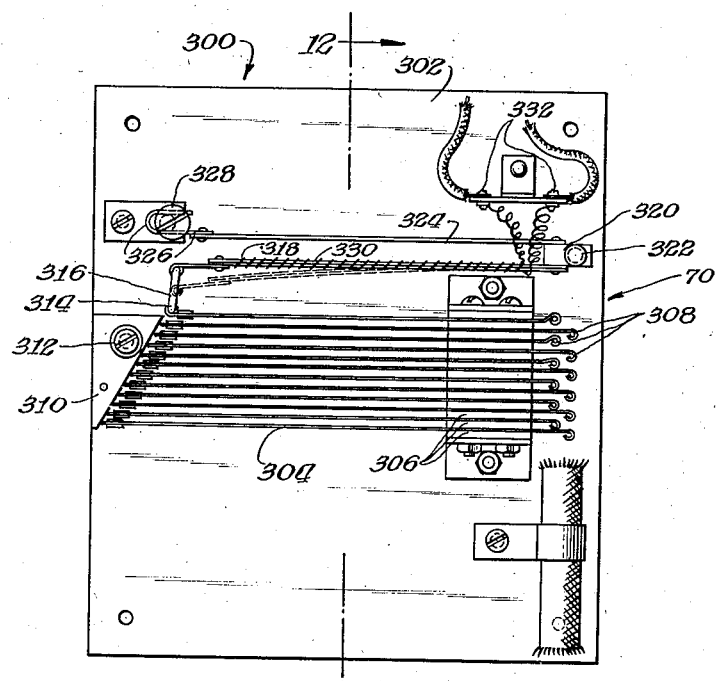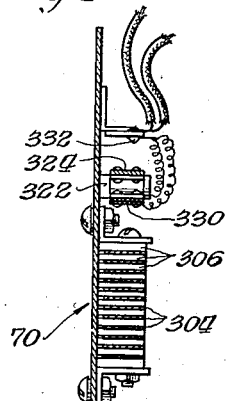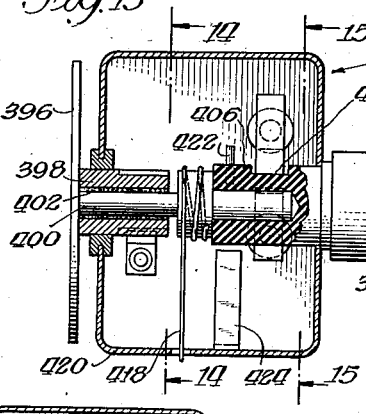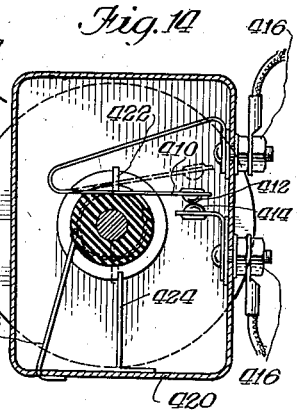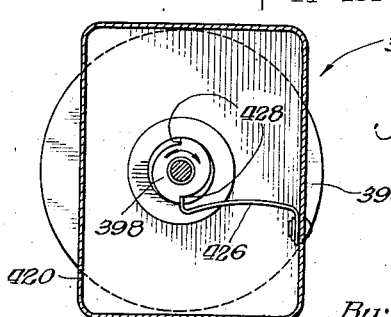

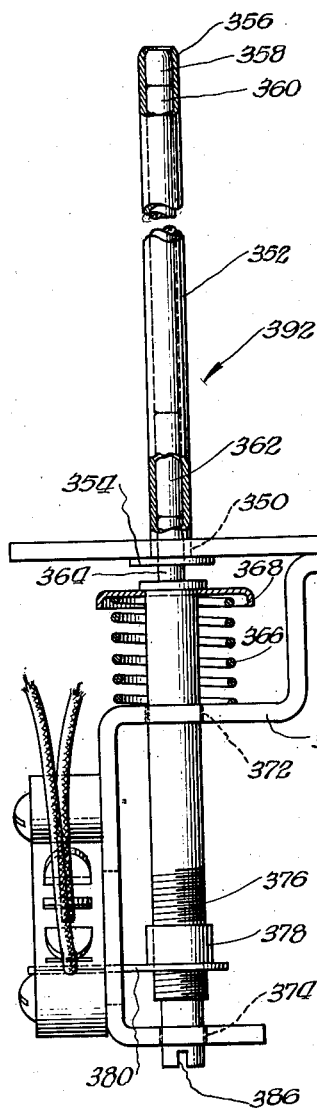
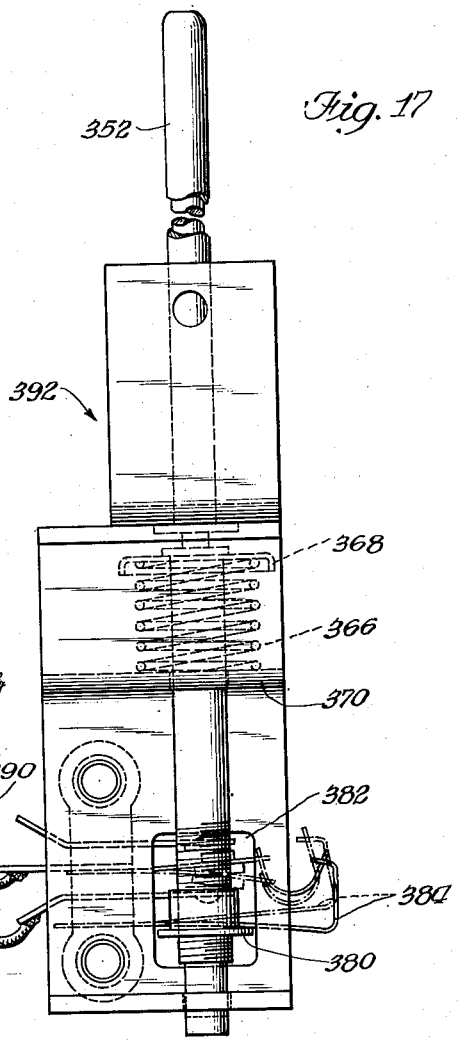
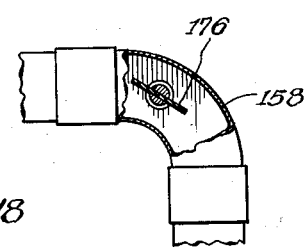

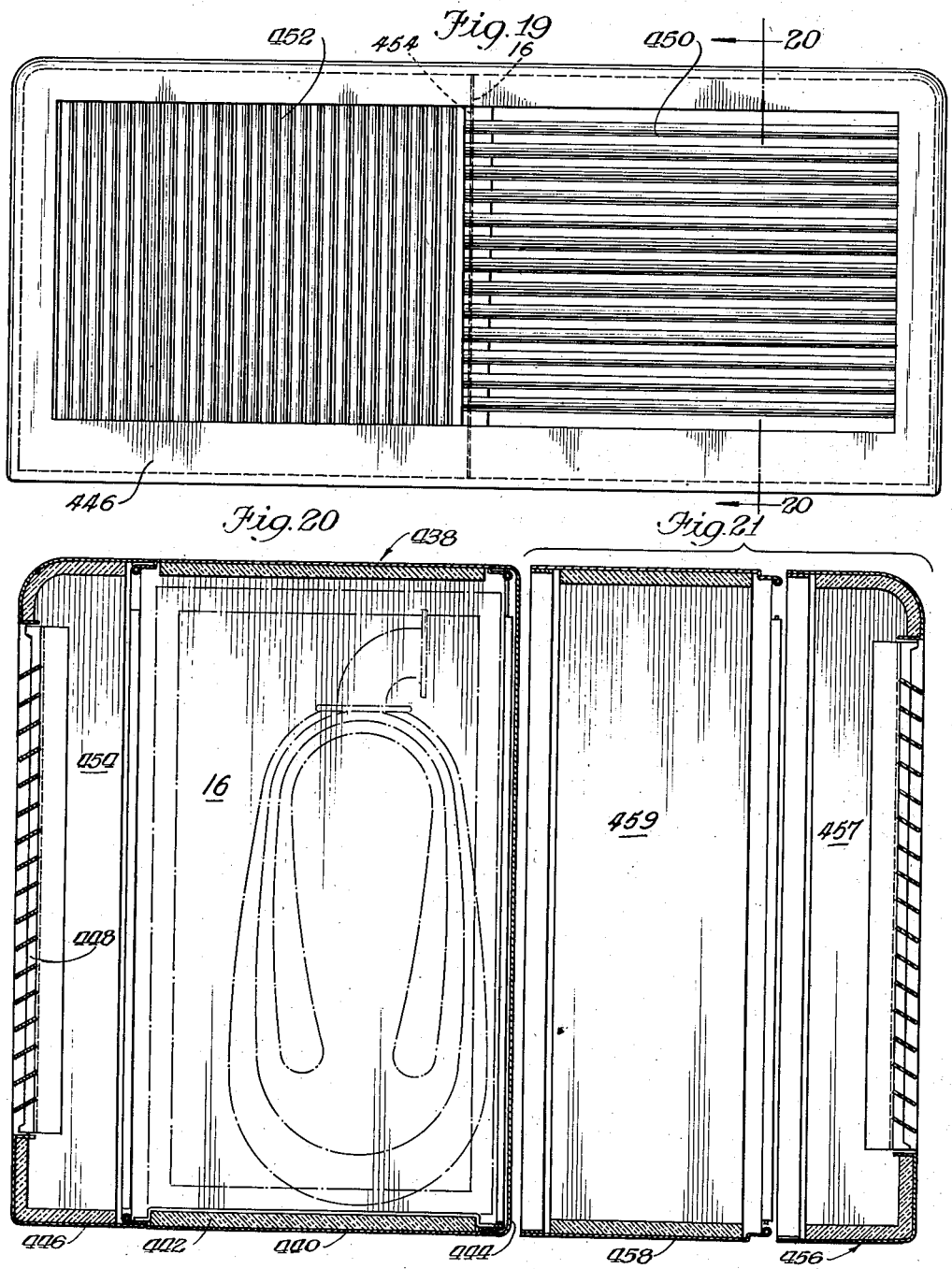

Jan. 8, 1952 A. R. COLLINS ET AL 2,581,942
FUEL BURNING AIR HEATER
Filed July 17, 1946 11 Sheets-Sheet 11
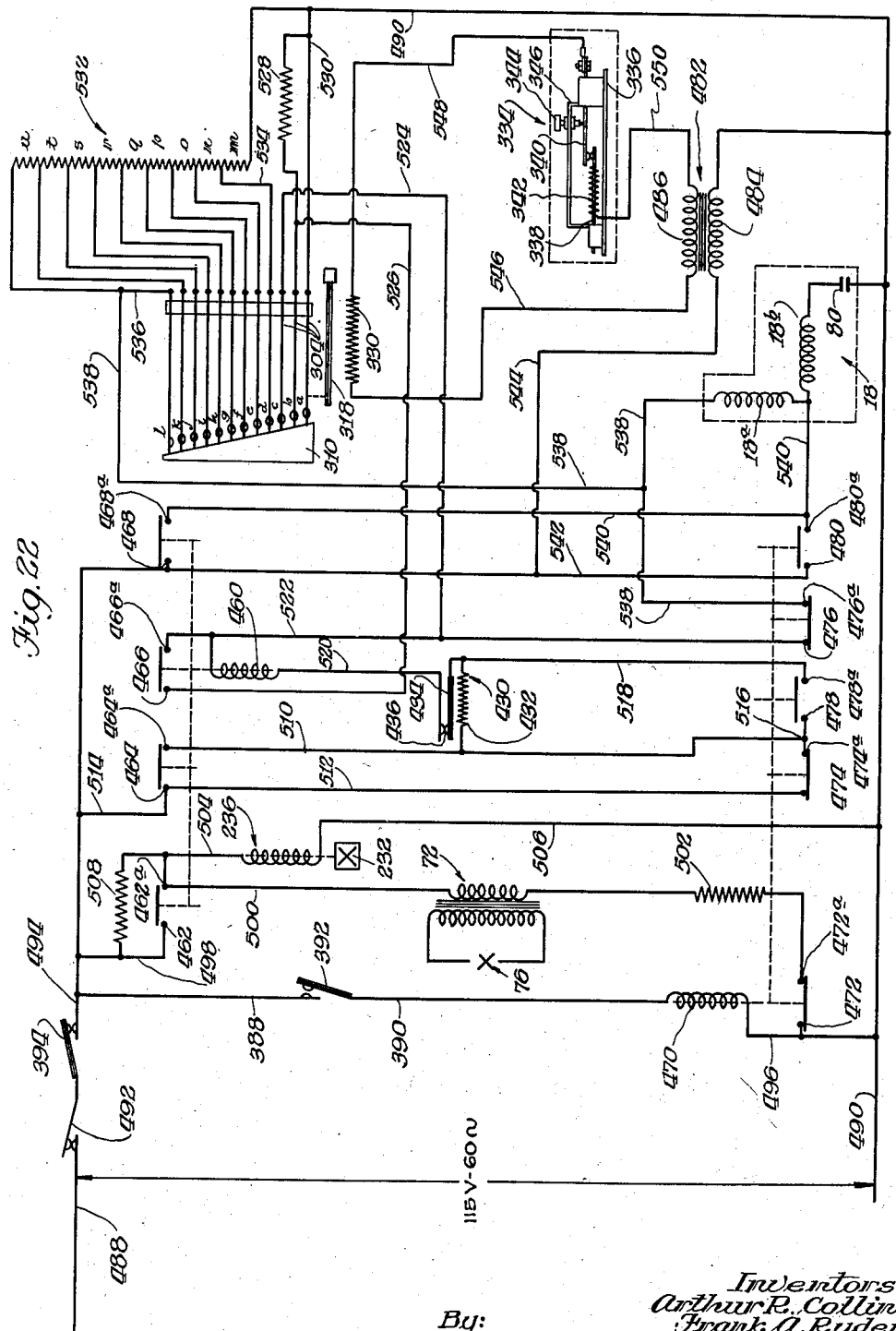
Inventors:
Arthur R. Collins
Frank A. Ryder
Ross D. Randall
By:
Hinkee, Horton, Ahlberg, Hausmann & Nupper
Attorneys Patented Jan. 8, 1952

2,581,942

UNITED STATES PATENT OFFICE 2,581,942

FUEL BURNING AIR HEATER

Arthur R. Collins, Frank A. Ryder, and Ross D. Randall, Indianapolis, Ind., assignors to Stewart-Warner Corporation, Chicago, Ill., a corporation of Virginia Application July 17, 1946, Serial No. 684,350

9 Claims. (Cl. 126—110)

The present invention relates to heaters and primarily to space heaters of the gas-fired type, although certain aspects of the invention are applicable to heaters using other fuels.

Domestic heating equipment of the most favored hot air type comprises a central furnace which is connected to remotely located outlets and inlets by means of rather extensive ductwork. Usually air is forced through the furnace and through the ductwork by an electrically driven blower. A system of this type is conventionally controlled so as to give on and off cycles of sufficient duration to supply just enough heat to balance the load condition. A thermostat sensitive to the temperature at one point in the space to be heated usually acts to turn the system on or off.

A system of this type is expensive largely because furnaces are not standardized and because of the complexity of the ductwork which must be built on the job. Since the furnaces are not standardized, control systems cannot be built in large production for a particular furnace but must be built so as to be adaptable to many types of furnaces. In addition, such furnaces are difficult to service particularly with regard to removing and servicing the burner and in replacing the burner if necessary.

The present invention makes the use of such duct systems unnecessary and is therefore well adapted for installation in houses already built and in which no duct system was incorporated at the time of building.

In all houses, and in smaller houses particularly, the portion of the cost of the building incorporated in the chimney is relatively large. Such chimneys are necessary with central heating plants, but are not needed with the heater of the present invention. It is apparent, therefore, that the present heating system saves a substantial element of cost normally found in most houses.

A further object of the present invention is to provide a heater and heating system in which the air for combustion is all taken from outside the building, passes through the burner, and is then exhausted outside the space to be heated with the result that no gas contamination within the space to be heated is possible and further that an explosive atmosphere within the space to be heated, such as may occur in a garage, filling station or the like, will not be ignited, since there is no communication between the air space within the space to be heated and the fire.

Still another object is to provide an improved heater of comparatively high heat output which is gas fired, which has forced air circulation, and which is compact.

Still another object is to provide a heater of this type which may be installed in a variety of ways by the simple substitution of interchangeable, standardized parts.

Yet another object is to provide a small, relatively inexpensive heater which operates as an independent unit including the control system and which is therefore readily adapted for use either singly or in groups of two in small, low-cost houses where the cost of the heating system preferably should be kept low or, which is equally adapted for use in larger groups in larger and more expensive dwellings under which condition the full advantage of uniform air distribution and low heat output per unit and therefore more quiet operation is more fully realized. In either event, a heater constructed according to the present invention should provide an improved heating system in a dwelling of almost any size or type at the same or lower cost than hot-air heating equipment now available.

An additional advantage is to provide a heater for accomplishing the above which is well adapted to mass production methods and which may be installed with minimum effort.

Other objects and advantages will become apparent from the following description of a preferred embodiment of our invention which is illustrated in the accompanying drawings.

In the drawings in which similar characters of reference refer to similar parts throughout the several views:

Fig. 1 may be considered as a front view of a heater incorporating the present invention shown with the front of the case removed so as better to disclose the interior mechanism;

Fig. 2 is a top view of the heater illustrated in Fig. 1. In this view the top portion of the case has been removed so as better to disclose the arrangement in the interior thereof;

Fig. 3 may be considered as a view looking at the right end of Fig. 1 showing the general location of the heater mechanism within the case;

Fig. 4 is a left end view of the heater illustrated in Fig. 1. In this view a portion of the mechanism has been broken away so as to show structure interiorly thereof;

Fig. 5 is similar to Fig. 1, but shows the back side of the mechanism;

Fig. 6 is a vertical longitudinal sectional view of the left-hand portion of Fig. 1 illustrating primarily the burner, heat exchanger, and associated mechanism;

Fig. 7 is a vertical transverse sectional view taken along the line 7—7 of Fig. 6;

Fig. 8 is a bottom view of a portion of the burner strip and associated mechanism;

Fig. 9 is a top view of a fuel control regulator forming a portion of the present invention shown with portions of the case wall broken away so as better to disclose the interior structure;

Fig. 10 is a medial sectional view of the regulator which may be considered as taken substantially along the line 10—10 of Fig. 9;

Fig. 11 is a side view of a heat output regulator or motor controller which modulates the heater according to demand conditions;

Fig. 12 is a vertical sectional view which may be considered as taken in the direction of the arrows substantially along the line 12—12 of Fig. 11;

Fig. 13 is a longitudinal sectional view in a vertical plane of an overheat control forming a portion of the present invention;

Fig. 14 is a transverse sectional view which may be considered as taken in the direction of the arrows substantially along the line 14—14 of Fig. 13;

Fig. 15 is a sectional view similar to Fig. 14, but taken in the direction of the arrows along the line 15—15 of Fig. 13;

Fig. 16 is a top view of a flame detector forming a portion of the present invention;

Fig. 17 is a front view of the flame detector illustrated in Fig. 16;

Fig. 18 is a partial sectional view showing a damper for adjusting the combustion air rate;

Fig. 19 is a front view of the heater cabinet;

Fig. 20 is a sectional view through the cabinet taken in a vertical plane substantially along the line 20—20 of Fig. 19.

Fig. 21 is a vertical sectional view similar to Fig. 20, but showing additional cabinet elements which may be used if desired; and Fig. 22 is an electrical circuit diagram suitable for use with the heater of the present invention.

GENERAL THEORY AND MODE OF OPERATION

Figure 1:
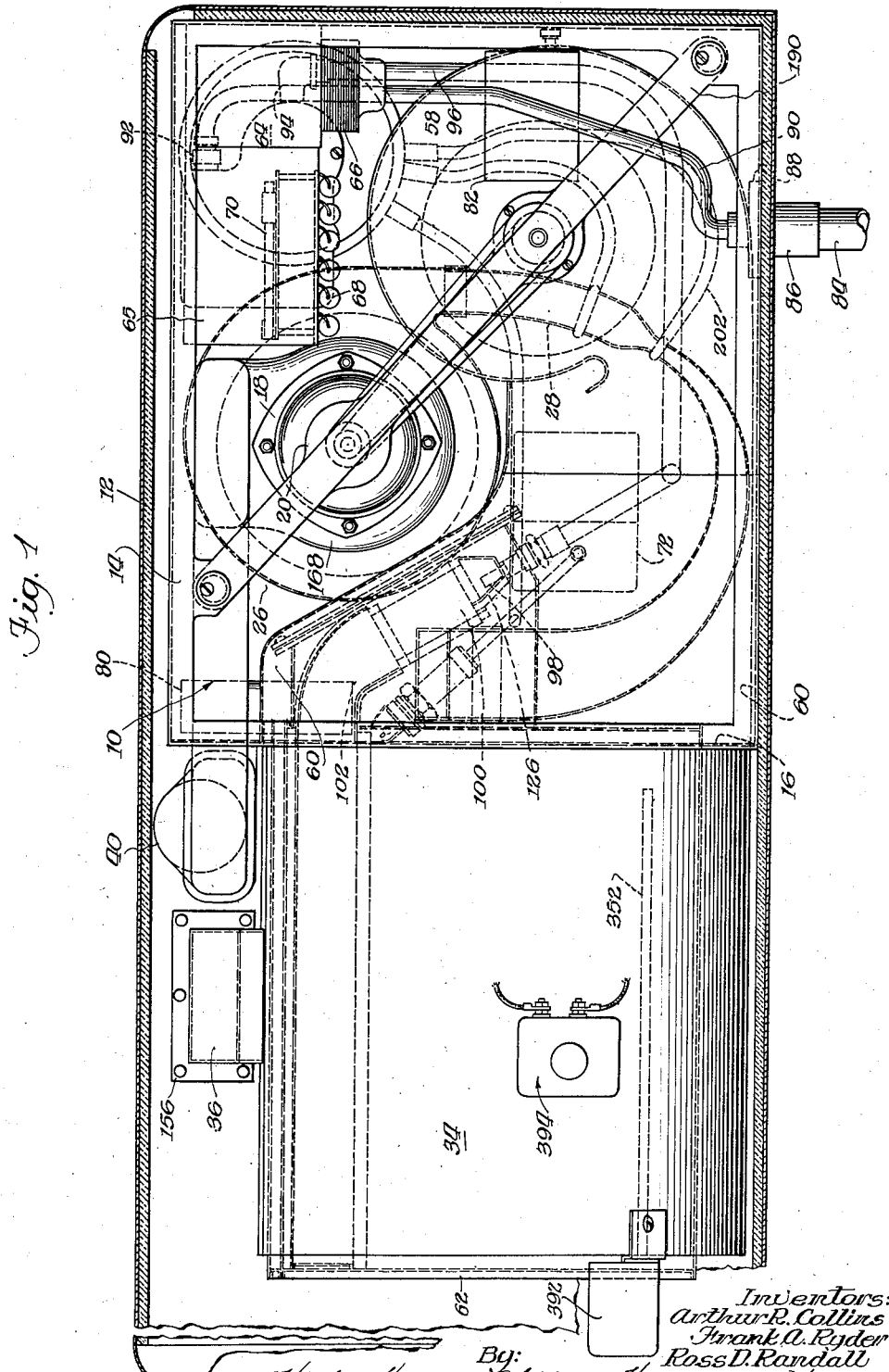

Among the essential characteristics of the heater of the present invention are that it be extremely compact and self-contained and need connection only to a source of fuel gas and electric power and have connections to air intake and exhaust pipes, both of which can pass into a hollow wall and rise vertically therein to the roof. A suitable arrangement for bringing in air for combustion and for removing the exhaust gases is disclosed and described in the now abandoned application of Theodore Y. Korsgren and Frank A. Ryder, Serial No. 596,130, which is assigned to the assignee of this application.

The heater is intended to be used primarily without ductwork, although there is no objection to, and in fact the invention contemplates the use of, some ductwork under some conditions. However, since the heating load is distributed among several advantageously located units, the ductwork for efficient distribution of the heated air, even at most, is, of course, of comparatively minor extent.

The individual heaters draw in a portion of the air from the space to be heated and this air is passed through a heat exchanger and is then reintroduced into the space, thereby setting up a circulation of air toward and away from the heater. This circulation is brought about by an electrically driven blower, the speed of which is automatically modulated according to the demand for heat. In mild weather the blower will operate at low speed while in severe weather the speed will be considerably higher. By the use of several heaters properly located so that the demand upon any particular heater is well below its rating, the blowers at no time, or, at least, at no times other than possibly under conditions of severe cold will be operated at outputs even approaching their capacity. With such a system the heaters will have an extremely low noise level.

As will be seen from the above, the primary control over the heater is exercised by controlling the blower motor speed. This blower motor drives both the ventilating air blower and a combustion air blower, so that the combustion air rate and ventilating air rate will track. Control means is incorporated in the heater so that the rate of combustion air flow determines the rate of fuel supply. Thus, the mixture ratio is kept constant under all operating conditions and the heat output tracks with the ventilating air rate. The temperature of the ventilating air therefore remains substantially constant under all conditions. The ultimate result is that air for heating is circulated at approximately the same temperature at all times, but under severe conditions more of this hot air is circulated than when the weather is mild. Since the temperature is constant it can be set at such level that the warm air feels neither too hot nor too cool to the occupants of the room. Inasmuch as the blower is operating substantially constantly regardless of the heat demand, it will be seen that the circulation of the air within the space is well maintained, thereby preventing stratification of the type which usually take place with ordinary warm-air heating systems whenever the room thermostat is satisfied and the blower is turned off.

Because a heating system using heaters of the type forming the subject of the present invention is built around units which can be fabricated by mass production methods and in which very little work upon the premises is necessary to complete a particular installation, it is apparent that the total cost of the ultimate heating installation is divided in such manner that almost all of the work is done at a factory where it can be performed more efficiently than is possible at the premises. Further, since the heat load in a particular installation will be divided among, as a rule, two or more heating units, it follows that a higher and more efficient rate of production can be achieved upon a single type unit than is possible upon larger furnaces where only one is used in each dwelling. This effect upon the relative costs of the two types of systems is still further exaggerated by the fact that so long as a house is heated by a single furnace it is necessary to build furnaces in different sizes for different sized houses, whereas when a single basic unit is used in groups of two, three, four, five or more, much higher production and therefore greater production efficiency can be achieved in the standardized model.

By the use of individual heaters, each of which is individually controlled, it is feasible without complication to maintain different zones throughout the dwelling at different temperatures. Thus, one or more heaters may be installed for handling the heat load of the bedrooms of a house and these rooms can therefore be maintained at a lower temperature than the living room, for instance, which may have its own heater. Workshops and garages can be maintained at still lower temperatures, if desired. For instance, they may be kept just above the freezing point most of the time and then simply by moving up the setting of the thermostat, these rooms can quickly be brought to any desired temperature.

Although heaters of the present type can be constructed to have any desired output, the particular heater shown operates up to approximately 20,000 to 25,000 B. t. u. per hour. Thus, two of these heaters have sufficient capacity to heat the average small house in the northern portion of the United States. In more elaborate installations where more heaters are used so as to obtain the best distribution of heated air, each heater will normally operate at well below the 20,000 B. t. u. heat output level even in extremely cold weather and therefore rooms, or, in fact, the entire dwelling can quickly be brought from a low temperature to a suitable level when desired. In other words, it is feasible to permit the temperature within the dwelling to drop to just above the freezing point during even comparatively short periods when the house is not occupied and then when the occupants return, the thermostats can be moved to the desired setting, whereupon the heaters will operate at their maximum heat output so as to bring the temperature within the space to a satisfactory level in just a few minutes.

Since under normal conditions the heaters will continuously modulate their heat output between high, low and intermediate points, they are not often called upon to start and stop and therefore the noise inherently incident to the starting and stopping of any type heating system is largely avoided. This is a particularly advantageous arrangement when heaters are located within the living space rather than being remotely located as is a conventional furnace, it being obvious that whenever heaters are installed either directly in a living room, for example, or recessed in a living room wall, a lower level of noise should be maintained than can be tolerated when a heater is remotely located.

GENERAL ORGANIZATION OF THE HEATER ELEMENTS

Referring to the drawings, the heater there shown includes a chassis 10 enclosed within a cabinet or case 12. In general, the cabinet is rectangular in all planes excepting for rounded corners and edges and will be described in greater detail subsequently. The chassis 10 comprises a frame 14 which encloses and supports the major operating elements. This frame is made up of rectangular sheet metal plates, with cut out portions and flanged edges, welded or otherwise suitably secured together at their corners and edges to form a skeleton box-like structure. One end of this frame, the left-hand end in Fig. 1, does not have an inturned flange but is closed by a plate 16 which serves as a stiffener and fire wall or partition or baffle to separate the heat exchanger and combustion chamber from the accessory compartment. For convenience in reference, the portion of the heater mechanism to the right of this wall, as seen in Fig. 1, will be referred to as the accessory compartment.

In general, the accessory compartment contains a variable speed electric motor 18 secured to a diagonally extending subframe 20 which in turn is secured in the main frame 14 by means of soft rubber shock mounts 22 for isolating motor, blower wheel and belt vibration.

Figure 3:
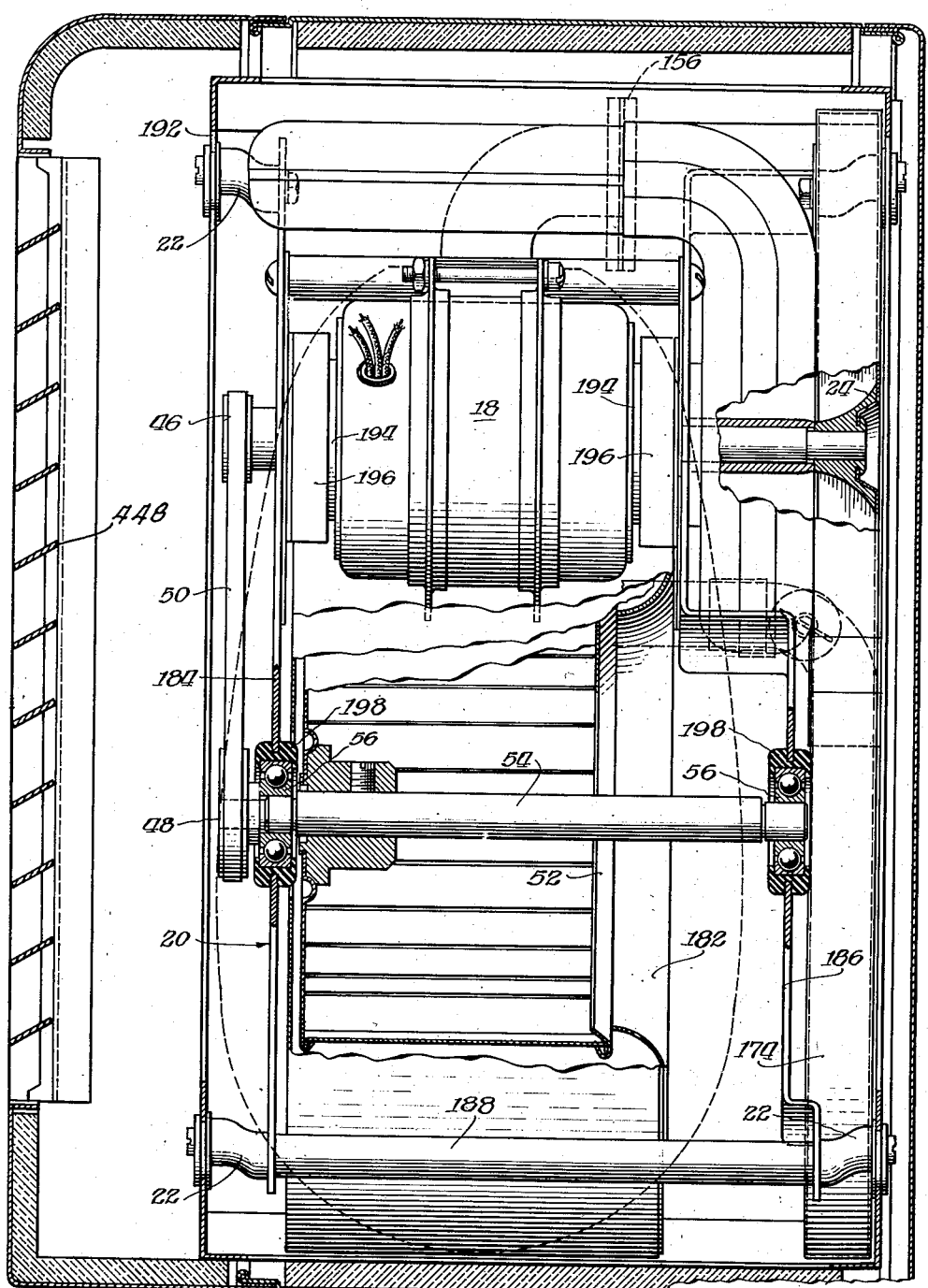

One end of the motor shaft, the right-hand end as seen in Fig. 3, is connected directly to a centrifugal-type blower wheel 24 located within a scroll case 26. The scroll case is secured directly to the frame 14 and is connected by ductwork 28 to a combustion air plenum chamber 30, as best seen in Fig. 6.

As will be described in greater detail presently, air from the duct 28 flows into the plenum chamber 30 and from there a portion of it mixes with the fuel gas and passes to the burner, while an additional portion supplies secondary air for combustion, the burning taking place within a combustion chamber 32. From the combustion chamber the hot products of combustion flow downwardly, outwardly, upwardly and then inwardly, as indicated by the arrows in Fig. 4, until they reach the top of the heat exchanger indicated generally by the numeral 34. At this point they make connection with an exhaust fitting 36 from which the products of combustion are conveyed to an exhaust pipe 38 leading through the building wall.

Air for combustion is drawn inwardly through a tube 40 passing through the wall of the building to a fitting or adapter 42 connected to a duct 44 leading toward the right of Fig. 1 to a position in approximate vertical alignment with the inlet opening of the blower 24. An elbow and adapter conducts the air downwardly from this point to the blower inlet. The entire combustion air, burner, and exhaust system, therefore, is sealed and communicates at both ends with the atmosphere outside of the building.

At its left-hand end, as seen in Fig. 3, the shaft of the motor 18 is equipped with a pulley 46 which drives a ventilating air blower pulley 48 by a V-belt 50. The pulley 48 is secured to a cross shaft 54 journaled at each end in bearings 56 supported by the downwardly inclined subframe 20 which also supports the motor 18. A ventilating air blower wheel 52 is mounted upon the shaft 54 and is, therefore, held in fixed alignment relative to the motor 18 but is shock mounted along with the motor with respect to the heater main frame.

The ventilating air centrifugal blower wheel 52 is disposed within a scroll case 58 located adjacent the lower right-hand portion of Fig. 1, this scroll case on its outlet side being connected to a sheet metal duct 60 leading to the ventilating air inlet of the heat exchanger 34. On its inlet side the ventilating air scroll case 58 simply opens to the space within the cabinet 12, and since this cabinet communicates with the space to be heated through louvers to be described in greater detail presently, air is drawn through these louvers, into the scroll case 58, and is passed by the ventilating air blower to the heat exchanger 34. After being heated within the heat exchanger the warm air passes from the outlet end 62 thereof into the space within the cabinet 12 on the opposite side of the fire wall or baffle 16. It therefore finds its way out into the space to be heated through a second set of louvers.

A group of accessories is located within the frame 14 in the upper right-hand corner, as seen in Fig. 1, and comprises a fuel pressure regulator valve 64, shown in greater detail in Figs. 9 and 10, and a box 65 which contains a pair of relays and a step-down control transformer 66 which has a primary operating at the line voltage of approximately 115 volts and a secondary which supplies a control current at approximately 24 volts. This accessory group also includes a motor speed controller comprised of a group of resistors 68 connected in series together with a multiple switch 70 which operates under changing temperature conditions to short out these resistance elements successively so as to increase the current to the blower motor 18.

A step-up ignition transformer 72 is located in a position beneath the motor 18 and has its secondary connected by a cable 74 to a spark plug 76 having its electrodes 78 located within the combustion chamber.

The motor 18 is preferably of the capacitor-start capacitor-run type which has been found very efficient for this purpose and the capacitor 80 for shading the appropriate motor winding is located in a vertical position just inside the fire wall adjacent one of the vertical sides of the frame 14 in a position near the top thereof. This capacitor may most easily be seen in Fig. 2.

A time-delay lock-open type switch to be described subsequently is located within a box 82 positioned toward the right-hand end of the frame, as seen in Fig. 1. It is just behind the scroll case 54 for the ventilating air blower and may best be seen in Fig. 1.

The fuel gas is brought into the heater through a pipe 84 provided at its end with a flanged adapter 86 which is secured to a matching flange 88 mounted upon the heater. The flange 88 is secured to a fuel tube 90 which communicates with the fuel pressure regulator at the fitting 92. The fuel gas after regulation leaves the regulator 64 by way of a fitting 94 which leads to a tube 96 which passes downwardly, longitudinally, and then upwardly at an angle to a fuel nozzle 98 located at the open end of an air aspirating fitting 100 in the plenum chamber 30. This aspirating fitting communicates at its downstream end with an elbow 102 leading to a gas burner 104 having a manifold and a multiplicity of downwardly extending burning openings 106 located within the combustion space. Secondary air for combustion passes directly from the plenum chamber 60 into the combustion chamber by way of a comparatively large opening 108 in the end wall of the heat exchanger.

*Burner and heat exchanger*

The heat exchanger indicated generally by the numeral 34 is constructed of heat and corrosion resistant sheet metal, such as high alloy stainless steel, for instance, the cut and formed pieces of metal being welded into a unitary substantially air-tight structure. More specifically, the heat exchanger may be pictured as an oval, horizontally-disposed sheet metal tube 110 with a longitudinally extending burner manifold 112 located therein and positioned near the top thereof. The sheet metal tube 110 is enclosed within a larger but similarly shaped tube 114 which is spaced from the walls of the inner tube 110 at all points, the spacing being greater near the lower portion of the heat exchanger than at the top thereof. The spacing at several points is established by longitudinally extending clips 116 which are welded to the outer surface of the inner tube 110 and press with their opposite ends against the inner surface of the outer sheet 114. The exhaust elbow 36 passes through a longitudinally extending strip 118, the edges of which are crimped, as at 120, to the upper ends of the outer sheet 114. The inner or lower ends of the elbow 36 is welded to the surface of the inner tube 110 and communicates with the space inside this inner tube through a suitable opening.

In order to obtain more heat exchange surface and a better distribution of the hot products of combustion against the surface of the sheet 110, a hollow horeshoe-shaped baffle 122 formed preferably of a continuous sheet of stainless steel or the equivalent is in effect draped around the burner manifold 112 in a position between the burner manifold and the sheet 110 and extends downwardly almost to the lower end of the space within the sheet 110. The hollow baffle 122 may be considered as an oval tube, approximately one half of which has been bent inwardly to form a re-entrant surface within the major portion. The spacing within the hollow baffle is such that air flows more freely therethrough in a longitudinal direction near the lower portion thereof than adjacent the top portion.

The space within the heat exchanger which confines the products of combustion is closed by end plates 124 which extend across the areas circumscribed by the ends of the sheet 110, with the exception of the ends of the horeshoe-shaped tube formed within the hollow baffle 122, these end plates being welded to the sheets 110 and 122. Thus, whenever there is a pressure differential between the two ends of the heat exchanger, air will flow longitudinally through the horeshoe-shaped passage within the hollow baffle 122 and through the annular space between the sheets 114 and 110.

The burner manifold 112 extends longitudinally through the upper portion of the inner chamber of the heat exchanger from end to end thereof. At the downstream, or left-hand, end as seen in Fig. 1, the manifold is closed, while at its opposite or inlet end it is equipped with the elbow 102 which extends downwardly at an angle of approximately sixty degrees or so to its inlet where it is connected to the gas aspirator 100 previously mentioned. The gas nozzle 98, also previously mentioned, is positioned in axial alignment with the inlet opening of the aspirator and alignment is maintained by a spider 126 secured to the end of the aspirator, the spider having a central opening 127 through which the nozzle projects. Thus, fuel gas flowing through the fuel pipe 96 and nozzle 98 will reduce the pressure adjacent the inlet opening of the aspirator so as to draw primary air inwardly, thereby forming a rich gas and air mixture. This mixture passes into the manifold and flows therefrom in a downward direction through a multiplicity of burner openings 106 formed in a longitudinally extending strip in the lower portion of the manifold.

The plenum chamber indicated generally by the numeral 30 is formed as a sheet metal cup with the bottom secured directly within an opening in the upstream end plate 124 of the heat exchanger so as to provide an outwardly extending sleeve or cup 128 which projects a short distance into the accessory compartment 10. All but the lowermost portion of this sleeve conforms to the general shape of the upper portion of the inner surface of the hollow baffle 122 (Fig. 4). In other words, it conforms to the shape of the upper portion of the combustion chamber at its inlet end. At its lower end this opening terminates on a line approximately halfway between the top and bottom of the heat exchanger.

The space inside the sleeve 128 communicates directly with the upper portion of the inner heat exchanger chamber by way of an opening 130 in the end of the cup through which the burner manifold extends. This upper portion of the heat exchanger, that is, the portion within which the burner manifold is located, is indicated by the numeral 132 and is separated from the space below the burner by a pair of downwardly inclined side plates 134 which extend alongside the burner manifold at its lower edge throughout its length, these plates being slightly separated from the edge of the manifold to form a pair of slots 136. The plates and burner manifold are secured in assembled relationship by generally wedge-shape brackets 138 which are welded to the plates 134 and to the burner tube.

The manifold is placed in the heat exchanger and combustion chamber by sliding it in endwise so that the plates 134 fit into slots 140 formed between a pair of sheet metal ribs 142 which are located in parallel relationship and form the slot 140 therebetween. The strips 142 are welded to the inner surface of the heat exchanger wall on both sides. This construction serves to divide the interior of the heat exchanger into the upper chamber 132 previously mentioned and the lower combustion chamber, these two spaces communicating through the slots 136 alongside the fuel openings in the lower portion of the burner manifold. Thus, air which finds its way from the plenum chamber through the opening 130 is forced downwardly through the slots 136 and serves as secondary air to complete combustion of the rich fuel and air mixture passing through the burner openings 106.

At the plenum chamber end, the plates 134 are connected to a downwardly extending flange 144 which lies in face-to-face relationship with the closed end of the cup 128 when the burner tube is in assembled relationship to the heat exchanger. This flange 144 is sealed to the closed end of the cup 128 by means of screws 146 which extend through the flange 144 and are threaded into the closed end 128. The flange 144 also has an offset portion 148 which is welded to a bushing 150 into which the spark plug 76 is threaded so as to position the spark plug terminals adjacent the gas outlet openings.

In order to make the heat exchanger and combustion chamber portion of the apparatus easily removable for servicing, the gas nozzle 98 is threaded to an adapter 152 welded or otherwise suitably secured to the wall of the plenum chamber 30. The inlet end of the nozzle is connected to the gas pipe 96 by a union-type fitting 154. In order to remove the heat exchanger and burner from the remaining portion of the heater, it is necessary merely to carry out the following steps. First either front grill 446 or back plate 444 (Fig. 20) is removed to permit access to the compartments on either side of the partition 16. The exhaust elbow 36 is disconnected from the exhaust pipe 38 at a flange indicated by the numeral 156. The gas pipe 96 is disconnected at the union 154. The combustion air inlet pipe 28 and an elbow 158 at the upper end thereof are disconnected from a pipe stub 160 which leads into the plenum chamber 30, the elbow 158 and stub 160 being joined by a removable clamping ring 162 of any suitable type. After the above-mentioned connections have been broken, the heat exchanger can be slid in an endwise direction out of the opening in the fire wall 16, the fire wall and heat exchanger being connected simply by a friction fit. After the heat exchanger and burner have been removed as a unit from the heater, a cover plate 164 which closes the outward end of the plenum chamber is removed, and the nozzle 98 is unscrewed from its bushing 152. Also, the screws 146 which secure the flange 144 against the wall 128 are taken out so that the burner tube can be slid out of the combustion chamber in an endwise manner. After the burner tube has been at least partially removed, the spark plug 76 can be conveniently taken out of the bushing 150. The parts may be reassembled by reversing the process.

*The combustion air supply system*

Combustion air enters the heater from outside the building through the pipe or duct 40 previously mentioned. From this duct the air flows through the adapter 42 and elbow 44 and thence at right angles through the fire wall 16 into the accessory compartment. This horizontally extending portion of the duct, indicated by the numeral 166, is comparatively thin from top to bottom and wide from side to side so as to crowd the accessory compartment as little as possible. At the point where the end of this duct 166 comes into vertical alignment with the motor 18, it connects with a double elbow which changes the direction of the duct system toward the rear wall of the cabinet and thence downwardly to an adapter 168 which covers the inlet opening of the combustion air blower case 26.

The outlet end of the blower is best seen in Fig. 5 where it is indicated by the numeral 170. This outlet opening connects to a sheet metal formed duct which extends downwardly and slightly toward the fire wall for a short distance where it is connected to a venturi 172, the outlet of which leads to a diverging pressure recovery section 174 which curves downwardly, toward the fire wall, and thence upwardly alongside the fire wall to the elbow fitting 158 previously referred to. From the outlet of this elbow the air passes through the clamping ring 162 and stub 160 into the combustion air plenum chamber.

Inasmuch as different installations of the heater will impose different amounts of pressure drop upon the combustion air system, depending upon the length and restrictive effect of the inlet and exhaust pipes, a small damper 176, best seen in Fig. 18, is located in the elbow 158. This damper is of the butterfly type and is mounted upon a shaft 178 which extends through the side wall of the elbow and is provided with an adjustment knob 180 at the end thereof. The damper shaft has a comparatively tight fit so that although it can be adjusted manually to give the combustion air side of the heater the pressure drop characteristics desired, there is sufficient friction to cause the damper to remain in the set position. Normally, this damper will not need adjusting excepting at the time the heating system is installed.

Within the combustion air plenum chamber, the air stream is divided, as previously described, so that a portion mixes with the fuel gas prior to passing to the burner while the remaining portion flows downwardly through the slots 136 to supply secondary air for combustion. From the heat exchanger the exhaust gases pass outwardly through the exhaust pipe 38, as previously described.

*The ventilating air circulating system*

The ventilating air scroll case 58 previously referred to receives air directly from the accessory compartment through the opening 182 which is faced away from the grilled opening of the cabinet, since by so doing less blower noise gets into the space to be heated. From the opening 182 the air passes axially into the wheel 52 and thence outwardly into the scroll case 58 and into the duct 60. This duct is formed so as to pass beneath the motor 18, beyond which the upper portion of the duct slopes sharply upwardly so as to form an adapter section which is secured to the fire wall completely around the outside sheet 114 of the heat exchanger.

*The mounting for the motor and blower wheels*

The subframe 20 is comprised of a pair of side rails 184 on the front side and 186 on the back side. These two rails are braced at the top and bottom by cross struts 188 secured thereto so as to form a sufficiently stiff structure. The ends of this frame are connected to the inside ends of rubber shock mounts 22 previously mentioned, the opposite ends of which are secured in the frame 14. As shown, the frame 14 has a stiffening member 190 on each side which parallel the side rails 184 and 186. The shock mounts 22 comprise a short length of soft rubber with its ends vulcanized to metallic buttons which are adapted for attachment to the frame members. Shock mounts of this type are well known and need no further description here. Preferably, to provide adjustment for the shock mounts, the fastening element on the outer ends passes through slots 192 in the frame so that the outer ends can be loosened and moved about so as properly to locate the two blower wheels relative to their scroll cases.

The motor 18 is provided with bells 194 at its ends which are secured in soft rubber rings encompassed by bands 196 carried by the subframe members 184 and 186. These rubber rings, therefore, absorb the major portion of the linear vibration of the motor and practically all of the axial torsional vibration. The ventilating air blower shaft 54 is provided at its ends with bearings 56 which similarly are carried in soft rubber rings 198 secured in openings in the subframe 184. This construction results in most of the motor vibration and the wheel vibration being isolated from the subframe 184 and what vibration does not reach the subframe is isolated from the main frame by shock mounts 22. The result is that the motor and blower wheels operate extremely quietly.

*The fuel pressure regulator and system associated therewith*

The venturi 172 in the combustion air line is provided with a pressure tap 200 (Fig. 5) which is connected by a tube 202 to a low pressure fitting 204 of the fuel controller 64, best shown in Figs. 9 and 10. A second pressure tap 206 is located upstream of the venturi and is connected by a line 208 to a high pressure tap 210 of the controller 64. The control valve 64 also has a third tap 212 which may be considered as an atmospheric pressure tap. Actually, it is connected by way of a line 214 with a fitting 216 in the side wall of the plenum chamber so that this tap is approximately sensitive to the pressure at the burner.

Referring now to Figs. 9 and 10 which illustrate the control valve in detail, it will be seen that the device comprises a casting 218 provided at one side with a chamber 220 connected to an inlet fuel fitting 92. In order to remove solid or gummy matter from the fuel, the fuel passes from the fitting 92 into a fine mesh screen filter element 224 located within the chamber 220 and thence outwardly through the openings in the screen into the chamber 220 proper. From here the fuel gas passes through a port 226 into a valve chamber 228. So as to insure the fuel being turned off completely whenever heater operation is shut down, the port 226 is provided with a valve seat 230 and with a poppet valve 232 located in operative relationship therewith. This poppet valve has a soft seat and is connected to an armature 234 of a solenoid 236. Normally, the poppet valve 232 is urged into closed position by a coil spring 238 so as to close off communication between the chamber 220 and the valve chamber 228.

The two electrical leads 240 of the solenoid are brought out and secured to insulating terminal posts 242 to which electrical connections may be made from the outside, these two terminal posts passing through the casting 218 where it forms the lower side wall of the chamber 220. Whenever the solenoid 236 is energized electrically, the armature 234 will be urged downwardly so as to move the poppet 232 away from the valve seat 230, thereby permitting fuel gas to flow from the inlet fitting 92 to the valve chamber 228.

The valve chamber 228 comprises a drilled passage through the casting which intersects the port 226. One end of this passage 228 is provided with a valve seat 244 which cooperates with a cone type valve 246 mounted upon a valve stem 248. The valve seat 244 is formed in a bushing 250 pressed into the passage 228. Just beyond the bushing 250 a pair of spaced flexible diaphragms 252 and 254 are clamped at their edges around an annular ring 256 by means of a sheet metal cover plate 257 and a similar plate 259 having an opening in the center thereof, the plate 259 being secured by means of screws, not shown, to the face of the casting 218 substantially concentrically with the valve stem 248. In order to insure a tight seal, the surface of the casting at the point of securement to the plate 259 is preferably counterbored as at 258 and a soft rubber gasket 260 is interposed between the two surfaces. The annular ring 256 is formed integrally with a centrally disposed partition 262 which divides the region between the diaphragms into separate spaces, the space adjacent the diaphragm 252 being indicated by the numeral 264 while the outermost space adjacent the diaphragm 254 is denoted by the numeral 266.

The valve stem on the inlet side is secured to the center of a thin flat spiral spring 270 which is formed by cutting a pair of spiral slots through a thin spring metal disk. The edge of the disk is secured in the bottom of a counterbored opening 272 by a ring 274 held in place by a cover plate 276. The spring applies slight pressure to the end of the valve stem 248 so as to urge the valve 246 toward closed position. This pressure, however, is very slight and the purpose of the spring primarily is to center the valve stem and to cause it to follow the diaphragms rather than to apply any considerable pressure thereto.

The opposite end portion of the valve stem passes through a guide 278 secured to the upper end of the bushing 250 and its end is in engagement with a button 280 secured to the lower surface of the diaphragm 252 so that downward movement of the diaphragm will move the valve 246 toward open position while the soft spring 270 causes the valve to follow the diaphragm when the diaphragm moves in the opposite direction.

At its center the partition 262 has a drilled opening extending therethrough into which is pressed a pair of guides 282 which provide a loose fit for a pin 284. This pin rests with its ends against each of the diaphragms 254 and 252 and holds the diaphragms in spaced relation since, as will be pointed out presently, the tendency of these diaphragms is to move toward each other. In order to prevent the diaphragms from sagging to one side, thereby upsetting the adjustment, the diaphragms at their centers are provided with backing plates 286, the centers of which are cut to form tabs which are rolled into flattened oval shape and are drilled in alignment with the pin 284. These tabs, indicated by the numeral 288, act to support the diaphragms from the pin 284 regardless of the position of the device.

As best shown in Fig. 10, the high pressure tap 210 communicates through the cover 257 with the space 290 between the cover and the diaphragm 254. The space 266 on the opposite side of this diaphragm communicates by way of a passage 292 formed in the edge portion of the annular ring 256 with the fitting 204, this fitting being connected, as has previously been mentioned, with the low pressure point of the combustion air venturi 172. The space 264 between the partition 262 and the other diaphragm 252 is connected by way of the fitting 212 to the plenum chamber at the burner. The remaining space, indicated by the numeral 294, on the opposite side of diaphragm 252 is of course sensitive to the pressure of the fuel on the outlet side of the valve 246. This chamber is connected by way of a passage 296 to a fitting 298 connected to the gas pipe 96 leading to the burner.

The fuel pressure regulator operates in the following manner. Whenever the electrical circuit to the terminals 242 is energized, the poppet valve 232 will be opened by the solenoid 234, thereby permitting gas to flow to the modulating valve 246. If, now, it is assumed that the combustion air blower is operating and that the pressure in chamber 266 is lower than it is in chamber 290 since combustion air flowing through the ductwork will cause a lower pressure at the venturi 172 than at the high pressure tap 206, it will be seen that the pressure differential will tend to cause the diaphragm 254 to move toward the right, as seen in Fig. 10. As soon as it moves slightly, the valve 246 will be opened and gas will flow into the chamber 294 and thence to the burner by way of the passage 296. Inasmuch as the pressure in the chamber 264 is at the level of the burner, or, in other words, substantially at atmospheric, the pressure of the gas will build up until the difference in pressure between the gas and the combustion air at the burner, this pressure differential tending to move the diaphragm 252 toward the left, balances the forces acting on the diaphragm 254. The burner, therefore, continues to receive fuel at the rate established by this balance. If, now, the combustion air blower is increased in speed so as to increase the differential tending to move the diaphragm 254 toward the right so as to open the valve, it will be seen that immediately the gas pressure in the space 294 will rise until a new balance is found, after which the burner continues to operate at a higher output since it is receiving both more combustion air and more fuel. Thus, by the expedient of simply controlling the speed of rotation of the combustion air blower, the heat output can be fixed at any desired level within the range of operation of the heater and under all such conditions the fuel air ratio will remain substantially constant, thereby insuring efficient combustion.

In Fig. 9, it may be noticed that the three pressure taps 204, 210 and 212 are radially separated so as to facilitate making connections to these taps. In Fig. 10, one of these taps 210 has arbitrarily been moved into radial alignment with the tap 204 so as to be in the plane of the section for the purpose of illustration, since it is believed that by so doing the construction and mode of operation will be made more clear. The pressure tap 212, however, has been permitted to remain in its actual location since the passages in the annular ring 256 for making connection between this tap and the space 264 are the reverse complement of those shown for connecting the tap 204 with the space 266.

*The motor speed controller*

The device for controlling the speed of the motor according to demand is illustrated in Figs. 11 and 12. It is indicated generally by the numeral 300 and comprises a base 302 to which are secured twelve contact-carrying blades 304. More or less could of course be used. The blades are secured in conventional stacked relationship between insulating spacing blocks 306 so that their extreme ends project beyond the block in one direction and form terminals 308 while their opposite ends extend sufficiently in the opposite direction to provide considerable flexibility. The ends of the blades are cut so that beginning at the top as shown, each blade is slightly longer than the next adjacent blade located thereabove. The blades are biased so that they tend to spring upwardly beyond the central point somewhat and are held downwardly by a tapered block 310 secured to the base by a screw 312. Each of the blades is provided with a contact adjacent its free end adapted to complete a circuit between the blade upon which it is secured and the next adjacent blade above and below when the blades are moved toward each other. Normally, however, when the free ends of all of the blades are against the block 310, the contacts will be separated.

The uppermost contact strip is formed at its free end to provide an eye 314 connected by means of a U-shaped link 316 to a bimetal thermostatic blade 318. The opposite end of this blade is secured to a block 320 journaled upon a pin 322. The opposite face of this block in turn is connected to a second bimetal element 324 which extends parallel to the thermostatic element 318. This strip 324 at its opposite end is secured to a yolk 326 which embraces an eccentric pin 328 which may be rotated relative to the base 302. Thus, by turning the eccentric pin 328, the left-hand end of the thermostatic blade 324, as seen in Fig. 11, can be moved upwardly and downwardly. The lower bimetal element 318 is wound with an electric resistance heater 330 which is intermittently supplied with electric power according to the temperature in the space to be heated as will be brought out more fully presently. The ends of this resistance element are brought out and secured to terminals 332.

This device operates as follows. When electric power is supplied to the terminals 332, the temperature of the heater 330 and therefore of the bimetal strip 318 will be raised somewhat. This causes the free end of the bimetal strip to deflect downwardly toward the dotted line position shown in Fig. 11 so as to urge the uppermost contact strip 304 downwardly. Upon slight downward movement, this contact is brought into engagement with the next lower contact so as to complete a circuit between the two topmost strips. Additional downward movement will urge the second strip into engagement with the third so as to short the three uppermost strips and so on. The top bimetal strip 324 acts as an ambient temperature compensating element so that changes in the temperature of the compartment where the device is located will not affect the operation of the motor controller. Normally, increasing the temperature in the space where the device is located would have the same effect upon the bimetal strip 318 as would increasing the rate of current supply to the terminals 332. This is compensated for, however, because any ambient conditions which cause the lower bimetal strip 318 to flex so as to move its free end downwardly will also cause the upper strip 324 to flex similarly, thereby rotating the block 320 in such direction as to compensate for the downward movement of the free end of the lower element. The converse is of course also true. Thus, changes in ambient temperature do not cause movement of the free end of the lower bimetal element.

The sending unit for supplying current to the heater 330 is shown diagrammatically in Fig. 22 where it is indicated by the numeral 334. This device comprises a base 336 to which two opposed contacting bimetal elements 338 and 340 are attached. One of these elements, 338, is provided with a heater 342 connected at one end to the strip 338. The second of the strips 340 is controlled by an adjustment knob 344 threaded through a bracket 346 so that when the knob is turned in one direction the lower end thereof will press the strip 340 downwardly. When a device of this character is connected in series with the bimetal heater 330 such that current flows through the strip 340, through the contacts to the strip 338, thence to the heater 342 and finally through the power source and back to the heater 330, the flow of current will cause the temperature of the heater 342 to increase. This in turn heats the bimetal element 338 and causes its free end to move downwardly, thereby separating the contacts. As soon as this happens, current ceases to flow, whereupon heater 342 and strip 338 cool until the contacts are brought together once more. This cycle repeats itself endlessly and the length of the on and off periods will depend upon the position of the contact secured to the strip 340. If this contact is in a higher location, less current will need to flow through the heater 342 in order to separate the contacts, thereby giving longer off cycles and shorter on cycles. The converse is also true. Inasmuch as the strip 340 is a bimetal element sensitive to the temperature of the space to be heated, the location of the contact secured thereto will be determined by the temperature of the room. The direction of deflection of bimetal element 340 is such that a decrease in temperature tends to cause this element to move downwardly so as to send longer on cycles and shorter off cycles. This causes the heater 330 to be energized for a greater portion of time with the result that its mean temperature rises. As explained previously, this causes the free end of this bimetal element to move downwardly, as seen in Fig. 11, so as to short successive contacts mounted upon the strip 304, such that the greater the decrease in temperature within the room, the more of these contacts will be shorted. A bank of resistance elements comprises a portion of this speed controller but has not been shown in detail since the connection would be more confusing than illuminating, it being deemed sufficient to show these resistors diagrammatically in Fig. 22.

*The safety devices*

Among the control devices provided in the heater of the present invention which serve protective or safety functions or miscellaneous functions are a pair of relays which may be of standard construction and therefore need no description, a lock-open type time-delay switch, an overheat switch, and a flame detector which influences the control circuit to be described presently approximately twenty seconds or so after combustion has been established.

The flame detector is illustrated in detail in Figs. 16 and 17 and comprises an L-shaped bracket 348 having an opening 350 through which a small stainless steel tube 352 extends. One end of this tube is provided with a collar 354 so as to limit outward movement of the tube, this collar being in face-to-face relationship with the back surface of bracket 348. The opposite end of the tube 352 is spun inwardly, as at 356, so as to prevent outward movement of a short stainless steel plug 358 located within the outer end of the tube. A loose-fitting fused quartz rod 360 is located within the tube and supports a loose-fitting stainless steel plug 362 located near the opposite end of the tube. Plug 362 in turn supports a stem 364 urged against the plug 362 by a coiled spring 366. This coiled spring bears at one end against a keeper 368 attached to the stem 364 while its opposite end presses against a portion of a bracket 370 welded to the L-shaped bracket 348. The bracket 370 is bent and drilled so as to form two spaced openings 372 and 374 through which the stem 364 extends. These openings prevent lateral movement of the stem but permit it to move inwardly and outwardly.

Near its outer end, the stem 364 is provided with threads 376 which are fitted to a threaded collar 378 having an actuating finger 380 which extends through a slot 382 in the bracket 370 and serves to operate a snap-type electric switch 384. The extreme outer end of the stem 364 has a screw driver slot 386 for adjusting the position of the actuation finger 380 so as to determine the temperature at which the switch operates.

The switch 384 preferably is of the over-center snap type and may be of standard construction. Although the particular switch shown is manufactured by the Acro Electric Company of 1314 Superior Avenue, Cleveland, Ohio, and is known as Acro switch model M, it will be appreciated that there are numerous other types of small snap switches which would be suitable for the purpose. The switch has contacts of the normally open type and completes the circuit between a pair of leads 388 and 390 when the finger 380 has been moved downwardly to a predetermined position.

Figure 2:
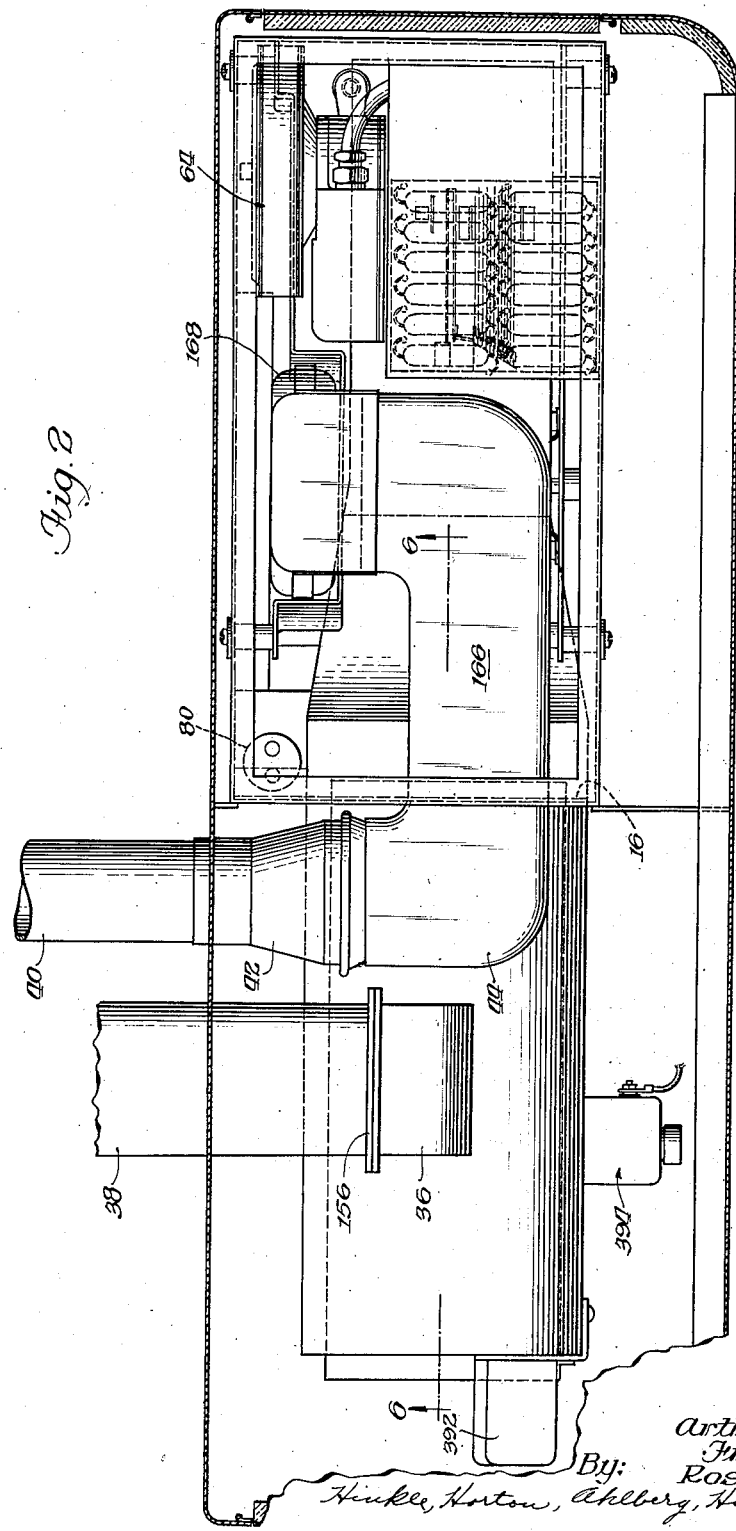

The flame detector is indicated generally by the numeral 392 and may be seen in the assembled heater in Figs. 1, 2 and 4. It is mounted upon the downstream end of the heat exchanger in such manner that the stainless steel tube 352 projects into the hot gas passage of the heat exchanger 34 near the lower end thereof.

The flame detector operates in the following manner. Whenever the temperature in the hot gas portion of the heat exchanger rises, the temperature of the stainless steel tube 352 and quartz rod 360 will be rapidly raised. This causes the tube 352 to elongate because of its comparatively high thermal coefficient of extension whereas the quartz rod remains substantially the same length because of its low thermal coefficient of extension. The result is that the stem 364 moves inwardly along the quartz rod. When the tube 352 has been heated to some predetermined temperature, the elongation of the tube 352 will be sufficient so that inward movement of the actuating finger 380 will operate the snap switch 384, thereby closing the circuit to the flame detector relay. Ordinarily, the flame detector will be so adjusted that it will operate to trip the flame detector relay approximately twenty seconds after combustion has been started.

The overheat switch is illustrated in detail in Figs. 13, 14 and 15. It is also shown in Figs. 1, 2 and 4 and is indicated generally by the numeral 394. It comprises a disk 396 secured to the end of a sleeve 398, the disk being located within the ventilating air passage formed between the air casing 114 and the outer wall 110 of the heat-exchanger 34. In this position it is normally maintained at the temperature of the ventilating air as long as ventilating air is flowing, but, if for any reason the ventilating air is turned off and combustion continues, the disk will quickly be heated by radiation and this heat will be conducted to the sleeve 398.

The sleeve forms a loose fit with a stem 400 and is rigidly fixed thereto by a film of soft solder 402 so that the sleeve and stem operate as a unit so long as the temperature is below the melting point of the solder. The stem 400 is secured to a resetting knob 404 composed of a nonconductor of electricity which has a generally cylindrical neck 406, excepting that a flat spot 408 is formed horizontally across its upper surface. This flat spot acts as a camming surface which lifts a switch blade 410 extending transversely thereto whenever the knob 404 is rotated so as to bring the cylindrical portion of the surface of the cam against the under surface of the switch blade. When the switch blade 410 is lifted, a contact 412 carried thereby is separated from a similar contact 414 so as to open an electric circuit between terminals 416.

A spring wire 418 is wrapped around an enlargement of the stem 400 and has its opposite end secured through a small hole in a case 420 which encloses the device with the exception of the knob 404 and the disk 396. This spring is so biased that it tends to rotate the knob in a counterclockwise direction as seen in Fig. 14. Rotation in this direction is limited to approximately 180 degrees, since at that point a pin 422 extending vertically from the upper surface of the neck 406 is brought against a stop element 424 welded or otherwise attached to the case 420 in a position directly beneath the neck. Normally rotation under the influence of the spring 418 is inhibited by a spring detent 426, the end of which bears against a radial flat spot 428 upon a double spiral cam surface formed in the sleeve 398. Two of these detents 428 are formed 180 degrees apart so that the sleeve 398 can be held in either of two positions also 180 degrees apart.

This device operates in the following manner. First, assume that one of the flat spots 428 of the cam is against the detent 426, thus inhibiting rotation of the sleeve 398 and the stem 400 in the direction in which these elements are biased by the spring 418, and that under these conditions the flat spot 408 is uppermost, thereby permitting contacts 412 and 414 to be brought together so as to complete a circuit between the terminals 416. If, under the above conditions, ventilating air ceases to flow while combustion continues, the temperature of the disk 396 would be raised and will heat the sleeve 398 until the solder 402 melts. As soon as this happens, the stem 400 is released from restraint and rotates under the influence of spring 418 until the pin 422 has been brought against the stop 424. This causes the camming surface in circumferential alignment with the flat spot 408 to lift the switch blade 410, thereby separating the contacts 412 and 414. As will be explained in conjunction with a detailed description of the electrical circuit of the heater, separation of these contacts turns off the heater completely.

When the heater has cooled, the solder 402 will solidify, again securing the sleeve 398 to the stem 400, the solder while melted being kept within the annular space between the stem and the sleeve by capillary action. As soon as the solder has solidified, the knob 404 may be rotated in a clockwise direction, thereby swinging the flat spot 408 into the uppermost position as well as winding the spring 418. Also, since the sleeve 398 and stem 400 are secured together, the sleeve will revolve 180 degrees, thereby bringing the detent into engagement with the flat spot 428 which is spaced 180 degrees from the flat spot previously engaged. The device is thereby reset for further operation.

The time delay switch also included as one of the control elements of the heater is indicated in Fig. 22 generally by the numeral 430. Essentially, it comprises a resistance heating element 432 which, when energized for a period of approximately forty seconds or so, causes a thermostatic element 434 to deflect so as to separate contacts 436, thereby opening an electric circuit. Once the circuit has been opened, the switch is adapted to keep it in open position until manually reset. Several types of switches for accomplishing this function are well known and no detailed description is therefore necessary. As an example, a suitable switch for this purpose is illustrated and described in the copending application of Ross D. Randall, Serial No. 643,329, filed January 25, 1946, for "Time Delay Switch" issued as Patent No. 2,438,186, dated March 23, 1948.

*The cabinet*

The constructional details of the cabinet are shown in Fig. 20. The principal element of the cabinet is a generally rectangular open sleeve 438 which forms a floor 440 beneath the heater chassis as well as providing the top and ends of the cabinet. This sleeve is preferably provided on its inside surface with pads of soundproofing material 442, such as glass wool batts, for instance, and is adapted to receive a back plate 444 at one end and a grill 446 at the other. The back and the grill are formed as shallow trays and slip into overlapping relationship to the ends of the centrally disposed sleeve 438. The grill may be of any desired type, that shown comprising a plurality of louvers 448 arranged in two groups, the inlet group for convenience being indicated by the numeral 450 and the outlet group by 452 as seen in Fig. 19. To prevent air recirculation between the outlet and inlet sides of the heat exchanger within the space behind the grill, a vertically disposed partition or baffle 454 is arranged behind the grill in alignment with the fire wall 16 and forms a continuation thereof when the grill is in place.

If desired, the back plate 444 may be removed and may be replaced by a second grill 456 which may be considered as the reverse complement of grill 446. Also, if desired, one or more extension sleeves as indicated at 458 in Fig. 21 may be used between either the front or back of the heater and a grill so as to locate the grill at a more remote point. The sleeves 458 are formed as rectangular shells similar to the shell 438 which are adapted to telescope over the flange at the front or back of the shell 438 and to receive either an outlet grill or an additional sleeve. As in the case of the grill 446, the grill 456 and the extension sleeves 458 are provided with vertical baffles or partitions 457 and 459, respectively, similar to the partition 454 for preventing recirculation of air between the outlet and inlet sides of the heater within the heater case. If desired, a damper may be located within the heater case downstream of the outlet end of the heat exchanger for diverting more or less air to one side or the other if outlet grills are used on both the front and back of the heater. Such a damper is not shown or described, since the arrangement and construction of such an element is within the capabilities of those skilled in the art.

The electrical circuit

The electrical circuit for the heater of the present invention is illustrated diagrammatically in Fig. 22 wherein the components previously described in detail are illustrated schematically. The circuit includes a relay, the coil of which is indicated by the numeral 460. This relay has four normally open sets of contacts, indicated respectively by the numerals 462—462a, 464—464a, 466—466a, and 468—468a. There is also a flame detector relay having a coil indicated by the numeral 470. This relay has three normally closed sets of contacts 472—472a, 474—474a, and 476—476a. It is also provided with two sets of normally open contacts 478—478a and 480—480a. In addition, a control transformer 482 having a primary 484 operating at line voltage and a secondary 486 which supplies a control current at approximately 24 volts is used.

Power to the circuit is brought in across line 488 and 490 at a convenient line voltage. This will usually be 115 volts, 60 cycle, and, therefore, for purpose of discussion such a line voltage will be assumed. One side of the line 488 supplies energy through a master switch 492 by means of which the heating system may be turned on and off. If desired, of course, this may be a double pole, single throw switch in both sides of the line. The switch 492 is in turn connected through the overheat switch 394 to the main heater operating line 494. Thus, opening of the overheat switch 394 serves the same function as the master switch in de-energizing the entire heating system. The flame detector relay coil 470 and the flame detector switch 392 are connected in series across the line by leads 388 which extend from the line 494 to the flame detector switch and thence from the switch to the flame detector coil through lead 390 and from the other end of the flame detector relay coil by way of lead 496 to the other side of the line 490. Thus, whenever the temperature within the heater has risen sufficiently to close the flame detector switch 392, the relay coil 470 will be energized. Conversely, opening of the switch 392 de-energizes the coil 470.

The primary of the spark transformer 72 is also connected across the line in series with contacts in both of the relays by means of a wire 498 which leads from the line 494 to relay contact 462, the other contact 462a of this group being connected directly to one side of the spark transformer primary by a lead 500. The other side of the primary is connected through a current limiting resistor 502 to the contact 472a of the flame detector relay while the other contact in this set, 472, is connected to the other side of the line by way of a branch extended to the lead 496. Thus, in order for the spark transformer to be energized, it is necessary that contacts 462—462a and 472—472a both be closed. The resistor 502 may or may not be used, depending upon the characteristics of the transformer. In practice it has been found that a considerably smaller transformer is adequate for ignition purposes and has the advantage of being lower in cost and taking up less space if the resistor 502 is used. This resistor has little effect upon the amount of current in the primary of the transformer at the time of breaking down the arc between the spark plug terminals. However, it limits the current in the secondary circuit under the low resistance conditions prevailing once the arc has been established.

The gas valve coil 236 is also energized when relay contacts 462—462a close. It is connected on one side directly to contact 462a by a lead 504, the other side being connected directly to the other side of the line 490 by the lead 506. Preferably, depending upon the characteristics of the gas valve, a resistor 508 of comparatively high value is connected across the terminals 462—462a so as to provide a leakage path which prevents the possibility of the gas valve holding open if the circuit to this valve should happen to be broken during one of the voltage peaks of the alternating current supply circuit. It occasionally happens in valves of this type that if the circuit is broken at one of the peaks, there may be sufficient residual magnetism in the core of the coil 236 to permit the valve to hold open. This, however, is avoided by use of the leakage resistor 508 which may have a typical value of something of the order of 30,000 ohms.

Relay contacts 464—464a are arranged in parallel with flame detector relay contacts 474—474a by wires 510 and 512, the former connecting contacts 464a and 474a while the latter connects contacts 464 and 474. One side of this circuit, for instance, that side represented by the contact 464, is connected to the line 494 by a lead 514 while the other side, that is, the wire 510, is connected to the heater coil 432 of the time delay switch 430 and also by a branch 516 to flame detector relay contact 478. The other contact of this last set, that is, the contact 478a, is connected by a wire 518 to the other side of the heater element 432 and also to the bimetal blade 434 of the switch 430. The blade 434 carries one of the contacts of the set 436, the other of which is connected by a lead 520 to one end of relay coil 460, the other end of this coil being connected to a lead 522 extending between relay contacts 466a and 476.

For convenience in discussion, the group of contact blades 304 of the motor speed controller have been indicated by the letters a to l, successively, beginning with the shortest blade which is the first to move when the bimetal blade 318 bends upwardly, as seen in Fig. 22. Of this group, blade c is connected by a wire 524 to the lead 522 previously mentioned. Blade b is connected by a wire 526 to relay contact 466 and also through a high resistance element 528 to contact a, this latter contact also being connected by a wire 530 to the side of the circuit indicated by the main line 490. The side of the line 490 is also connected to one end of a bank of resistance elements in series, this group of resistors being indicated generally by the numeral 532 and the individual elements beginning at the lower end, for convenience, being given letters from m to u. The common end of resistors m and n is connected by a lead 534 to contact d while similarly the common end of n and o is connected to contact e and so on, the topmost contact l being connected by a wire 536 to the outer end of the resistance bank, that is, the topmost end of resistor u. This wire 536 is also connected by a lead 538 to flame detector relay contact 476a and to one end of the motor winding 18a.

The end common to motor windings 18a and 18b is connected by a line 540 to flame detector contact 480a and also to contact 468a of the other relay. Contacts 480 and 468 are connected together by a lead 542 which is connected to one side of the line, that is, the side 494. It will be seen that contact groups 480—480a and 468—468a are in parallel, so that when either set of these contacts is closed, one side of the line will be connected to the common point of the motor windings 18a and 18b.

Line 542 which may be considered as an extension of one side of the line 494 is connected by a branch 544 to one end of the control transformer primary 484, the other end being connected directly to the other side of the line 490. The secondary 486 of the control transformer is connected on one side by a lead 546 to one end of the resistance heater 330, the other end of this resistor being connected by a lead 548 to one terminal of the thermostatic impulse sending unit 334, the other contact of this sending unit being connected by a lead 550 to the other side of the transformer primary 486.

The entire heater electric circuit just described is located within the heater case with the exception of the incoming leads 490 and 488, the thermostatic impulse sender 334, and, of course, a portion of the leads extending to this sender. This impulse sender is located within the space to be heated at a point where it will be sensitive to the temperature of the space and operates to maintain this temperature at the desired level.

*Operation*

The circuit operates in the following manner. Normally, the overheat switch 394 is closed so that as soon as the master switch 492 is closed the lines 490 and 494 will be energized. Under these conditions the control transformer 482 will have its primary energized by way of line 494, branch 544, the transformer primary 484 and thence to the other side of line 490. This energizes the secondary 486 and causes the impulse sender 334 to send on and off impulses of such relative lengths that the average current flowing in the secondary circuit is a function of the temperature within the space to be heated. If this temperature is high, that is, above the desired level, the off impulses will be long while the on impulses will be short. Therefore, heater 330 does not raise the temperature of the bimetal element 318 sufficiently to close contacts a and b. Under these conditions, all of the remaining electric components of the heater remain substantially de-energized.

Some current will flow through the resistor 508 but this is insufficient to actuate the gas valve 236 or the spark transformer primary 72. Also, there is a connection by way of line 514 to line 512, thence through relay contacts 474—474a to line 510 which in turn is connected through resistor 432 and contacts 436 to the relay coil 460 and thence from this coil through relay contacts 476 and 476a to one end of the motor winding 18a, the other end of which is connected to the other motor winding 18b, which in turn is connected to the other side of the line 490 through the capacitor 80. The lead 538 is also connected to the other side of the line 490 through the bank of resistors from m to u. The resistance of all these elements in series or series parallel is so high that the current flowing is insufficient to actuate any of these elements and does not constitue appreciable wastage of electric power.

If the temperature within the space to be heated decreases, the average current flow through the heater 330 will increase until bimetal element 318 has moved contact a against contact b. This shorts out the resistor 528 across these contact points. This resistor acts merely to prevent sparking at the contacts when the motor circuit is opened. Closing contacts a and b, however, does nothing beyond conditioning the circuit for future operation since lead 526 is open circuited at the relay contact 466.

A slight further drop in temperature in the space to be heated brings contact b against contact c so as to energize the relay coil 460 and the heater 430 of the time delay switch 432 in the following manner. Current flows from the line 494 by way of leads 514 and 512 and contacts 474—474a to line 510. From here the current passes through the heating element 430, switch blade 434 and contacts 436 to lead 520 which is connected to relay coil 460. From the other side of the relay coil the current passes through leads 522 and 524 to contact c and thence through contacts b and a to lead 530 which is connected with the other side of the line 490. The heater element 430, therefore, begins heating and the rate of heating is so arranged with respect to the characteristics of the bimetal blade 434 that it takes approximately forty-five seconds or so for this switch to open, providing the heating is continuous.

Energization of coil 460 shifts the relay contacts with the following result. The spark transformer 72 is energized by way of contacts 462—462a and normally closed contacts 472—472a. Sparking, therefore, commences at the igniter. Also, gas valve 232 is opened since it is energized through contacts 462—462a. Closing of contacts 464—464a has no immediate effect upon the circuit, but conditions it for future operation, these contacts being for the purpose of holding a circuit which otherwise would be subsequently broken. Contacts 466—466a also act to hold a circuit which would otherwise be broken subsequently. Closing of contact 468—468a permits current to flow from one side of the line 494 through contacts 468—468a to lead 540 which is connected to the common point of motor windings 18a and 18b. This energizes the shaded winding 18b by way of capacitor 80 and energizes the principal winding 18a through lead 538, contacts 476—476a and leads 522 and 524 to contact c which, as previously mentioned, is connected through contacts *b* and *a* to the other side of the line, 530 to 490.

Therefore, closing of contacts *b* and *c* places the ignition system in operation, turns on the fuel gas, and starts the blower motor at full speed. Under these conditions combustion should take place almost instantaneously and approximately twenty seconds later the flame detector switch 392 should close, thereby energizing flame detector relay coil 470. This causes contacts 472—472*a*, 474—474*a* and 476—476*a* to open and contacts 478—478*a* and 480—480*a* to close. Opening of contacts 472—472*a* de-energizes the spark transformer 72, thereby turning off the ignition since it is no longer needed. Opening of contacts 474—474*a* does not affect the circuit since contacts 464—464*a* in parallel therewith have been previously closed. Closing of contacts 478—478*a* shorts out the resistance heater 430 with the result that the time delay switch begins to cool without having opened. Energization of relay coil 460, therefore, takes place directly by way of contacts 478—478*a*. Closing of contacts 480—480*a* has no immediate effect since they are in parallel with previously closed contacts 468—468*a*.

When contacts 476—476*a* separate, this opens the direct connection between the side of the line 490 and the motor winding 18*a* and thereby causes winding 18*a* to be energized by way of branch 538 and resistance elements, *u, t, s, r, q, p, o, n* and *m*. The motor, theerfore immediately drops to its lower speed of operation.

The reason for starting the motor and blowers at other than their lowest speed is that the torque necessary to overcome friction and start the blowers is considerably more than is necessary to keep them in operation. Therefore, a lower heat output can be achieved if the heater is started at a rate higher than is used for maintaining operation. Also it is possible to maintain efficient combustion at a lower rate of fuel flow than is satisfactory for starting purposes. For these reasons, it is preferred to start the heater at a high rate of heat output and operate at this rate for approximately twenty seconds before dropping the heat output to a lower level. This momentary high rate of heat output also brings the heater up to operating temperature in less time.

If the temperature within the space to be heated continues to fall, the sending unit 334 will send longer and longer power impulses to the heating element 330 with the result that the bimetal element 318 will deflect farther upwardly, bringing together more and more contacts in the group *a, b, c, d* and so on. As each successive set of contacts is brought together, one of the resistance elements *m, n, o, p* and so on will be shorted out beginning with *m* so that the speed of operation of the blower motor increases progressively with a decrease in temperature within the space to be heated, thereby increasing the rate of heat output until a balance is reached. If this balance is approximately reached, for instance, when *f* and *g* contacts are together, then the only motor resistors remaining in the circuit are *u, t, s, r* and *q*. If the temperature gradually rises above this level, contact *f* will be separated from contact *g*, thereby adding resistor *p* to the series connection so as slightly to decrease the speed of the blower motor.

Under normal conditions, the heater may operate continuously for days or even months throughout moderately cold to severe weather completely within the range of the resistance bank 532. Eventually, however, the temperature within the space to be heated will tend to rise even with decreased heat output until contact *b* is separated from contact *c*. The separation of these two contacts does not immediately affect the circuit, however, since these two contacts are for the purpose of starting the motor at high speed and have no effect upon the circuit after operation of the two relays. Presently, however, contact *a* will be separated from contact *b*, thereby disconnecting lead 526 from the side of line 490. The relay coil 460 is, therefore, de-energized. This turns off the gas valve so as to terminate combustion. The motor, however, continues to operate at its lowest speed, being energized through contacts 480—480*a*. After the heater has cooled down somewhat, the flame detector switch 392 will open, thereby permitting the contacts of the flame detector relay to shift to their original starting position. The blower motor, therefore, stops a short time after combustion has been terminated and after the blower motor has had an opportunity to sweep out all of the exhaust gases from the combustion chamber and to cool the heater.

If it should happen that the contacts *a* and *b* separate, thereby permitting the relay coil 460 to be de-energized, and that substantially immediately thereafter the temperature within the space to be heated should fall sufficiently to cause contacts *a* and *b* to reclose, the heater will not immediately restart, starting being postponed until contacts *b* and *c* are brought together. The circuit is thus arranged so that the heater will not rapidly cycle off and on in mild weather. It also prevents chattering of the contacts, since even though contacts *b* and *c* close only momentarily their subsequent reopening will not de-energize the blower motor.

If at any time the power supply to the heater fails, the gas valve will close and the motor will stop, but the heater will restart promptly as soon as the electrical circuit is re-established. Overheating of the heater, such as may be caused by some interruption of the flow of ventilating air, will cause the overheat switch 394 to operate, thereby affecting the circuit exactly as though the main power supply had been turned off.

As previously described, if the heater does not start promptly, the time delay lock-open switch 430 will be actuated to interrupt heater operation and to turn off the gas supply until the reason for the malfunctioning has been corrected and the lock-open switch reset. If the heater ignites normally and operates for a time and then combustion ceases for any reason, the flame detector switch 392 will cool until the circuit through the relay coil 470 is opened. This separates contacts 478—478*a* so as to remove the short around the heater coil 432. In approximately twenty seconds, therefore, the time delay switch 430 operates so as to turn off the system and prevent starting until the time delay switch has been manually reset.

From the above description of a preferred embodiment of our invention it will be seen that a heater of this type fulfills all of the objects set out of it at an earlier portion in this specification and that such a heater is in fact admirably suited for its purpose.

Having described our invention, what we claim as new and useful and desire to secure by Letters Patent of the United States is:

1. In a heater of the type described, means forming a heat exchanger having a chamber therein, said chamber extending substantially from end to end of said heat exchanger, a burner tube adapted to extend substantially from end to end of said heat exchanger interiorly thereof, said burner tube having a plurality of longitudinally arranged burner openings on one side of said burner tube, fins projecting from said burner tube on each side adjacent said one side, said fins together with said burner tube forming slots adjacent said burner openings, and track forming means extending longitudinally of said heat exchanger from end to end, said tracks being adapted to fit said fins so that said fins can be inserted in said tracks at one end and said burner tube pushed longitudinally into said heat exchanger so that said fins in conjunction with said tracks form partitions dividing the interior of said heat exchanger into two chambers communicating with each other by way of said slots.

2. A heater comprising a heat exchanger, said heat exchanger having means forming longitudinally extending ventilating air passages open at the ends and a combustion space, a chassis for said heater having a partition forming a fire wall, said fire wall having an opening therein to fit said heat exchanger, ventilating air blower means located at one side of said fire wall and connected to pass ventilating air through said ventilating air passages, a casing enclosing said chassis and heat exchanger and having a removable wall substantially perpendicular to said fire wall, said casing having a set of air inlet openings communicating with the space inside of said casing at one side of said partition, and a second set of openings communicating with the interior of said casing on the other side of said partition, said removable casing wall having a baffle forming member which together with said fire wall divide the space interiorly of said casing into two spaces communicating with each other by way of said openings and the exterior air on the one hand and by way of said ventilating blower and the ventilating air passages through said heat exchanger on the other hand.

3. A unit heater comprising a burner, a heat exchanger adapted to receive products of combustion from said burner, a blower for supplying combustion air to said burner, a second blower for supplying ventilating air to said heat exchanger, each of said blowers having a blower case, means for attaching said blower cases rigidly with respect to said heat exchanger, a blower wheel disposed in each of said cases, an electric motor for driving said wheels, a frame supporting both of said wheels and said motor with respect to each other, and vibration-absorbing mounting means supporting said frame with respect to said blower cases so that said motor and said wheels are maintained in rigid alignment with respect to each other, but float as a unit with respect to said cases.

4. In a heater of the type described, means forming a heat exchanger having a chamber therein, a burner tube adapted to be positioned within said chamber to extend from end to end thereof, said burner tube having mixed gas and air outlet openings on one side thereof, generally oppositely extending members projecting from said burner tube adjacent said outlet openings, said members together with said burner tube forming secondary air outlet openings adjacent said mixed gas and air openings, mounting means for said burner tube located within said chamber and secured to said heat exchanger, said mounting members coacting with said burner tube and said members to divide said chamber into separate subchambers communicating with each other by way of said secondary air openings, and means to supply air for combustion to that one of said subchambers enclosing said burner tube.

5. A heater of the combustion type comprising means forming a casing having a ventilating air inlet opening adjacent one end and a ventilating air outlet opening adjacent the other end, a transverse partition within said casing and dividing the space therein into a first chamber and a second chamber, said first chamber communicating with said inlet opening and said second chamber communicating with said outlet opening, a heat exchanger located in said second chamber, said partition having an opening therein, said heat exchanger having one end adapted to be removably fitted to said opening and having ventilating air passages therethrough communicating with said partition opening whereby said chambers communicate with each other by way of the passages in said heat exchanger, a burner, means for removably attaching said burner to said heat exchanger at the partition end whereby said heat exchanger and burner can be removed as a unit after which said burner can be removed from said heat exchanger, and means on said heat exchanger forming a plenum chamber enclosing the inlet to said burner, said plenum chamber forming means being located in said first chamber and being adapted to pass through said partition opening upon removal of said heat exchanger.

6. A unit heater comprising a burner, a heat exchanger adapted to receive products of combustion from said burner, a blower and ductwork for supplying combustion air to said burner, a second blower and ductwork for supplying ventilating air to said heat exchanger, each of said blowers having a blower case connected to its respective ductwork, means for rigidly mounting said blower cases and ductworks, a blower wheel disposed in each of said cases, an electric motor for driving said wheels, a frame supporting both of said wheels and said motor with respect to each other, and vibration-absorbing mounting means supporting said frame with respect to said blower cases so that said motor and said wheels are maintained in rigid alignment with respect to each other, but float as a unit with respect to said cases and ductworks.

7. A convertible unit heater comprising means forming a casing open at two opposite sides, a partition within said casing substantially perpendicular to said open sides adapted to divide the space within said casing into two separate chambers, a heat exchanger, said partition having an opening therein, said heat exchanger having one end fitted to said opening so that the two ends of said heat exchanger communicate one with one of said chambers and the other with the other of said chambers so as to establish communication between said chambers by way of said heat exchanger, blower means in one of said chambers connected to take air from the last said chamber and force it through said heat exchanger into the other of said chambers, a burner for heating said heat exchanger, a removable member for closing one of the openings in said casing, said member having inlet and outlet ventilating air circulating openings therein one disposed on one side of said partition and the other disposed on the other side of said partition, another casing member, means at the other opening of said casing adapted for attachment to said last named casing member, the last said member having dimensions such as to act as an extension of said casing when attached thereto, and the last said casing member having a partition therein so disposed as to be in alignment with the partition in said casing when the last said casing member is attached to said casing.

8. A heater of the combustion type comprising means forming a casing having a ventilating air inlet opening adjacent one end and a ventilating air outlet adjacent the other end, a transverse partition within said casing dividing the space therein into a burner and heater accessory chamber and a heat exchanger chamber, said burner and heater accessory chamber communicating with said inlet opening and said heat exchanger chamber communicating with said outlet opening, means forming a heat exchanger located in said heat exchanger chamber, said partition having an opening therein, said heat exchanger having one end adapted removably to be fitted in said opening in a substantially airtight relation to said partition, said heat exchanger having ventilating air passages therethrough communicating with said partition opening whereby said chambers communicate with each other only by way of the passages in said heat exchanger, a burner structure, means for removably attaching said burner structure to said heat exchanger at the partition end of the latter, and means on said heat exchanger forming a plenum chamber enclosing the inlet end of said burner structure, said plenum chamber forming means being located in said burner and heater accessory chamber and being adapted to pass through said partition opening upon removal of said heat exchanger, said plenum chamber forming means having a normally closed opening through which said burner structure is removable when said heat exchanger, said burner structure and said plenum chamber forming means are removed from said casing.

9. A heater of the combustion type comprising means forming a casing having a ventilating air inlet opening adjacent one end and a ventilating air outlet adjacent the other end, a partition within said casing and dividing the space therein into two separate chambers, the first chamber communicating with said inlet opening and the second chamber communicating with said outlet opening, said partition having an opening therein, a heat exchanger located entirely within said second chamber and having one end adapted to be removably fitted to said opening in substantially airtight relation to said partition, said heat exchanger having ventilating air passages therethrough with their inlet communicating with said partition opening, and a ventilating air blower located in said first chamber and having an outlet communicating directly with said partition opening and the inlet to said ventilating air passages in said heat exchanger.

ARTHUR R. COLLINS.
FRANK A. RYDER.
ROSS D. RANDALL.

REFERENCES CITED

The following references are of record in the file of this patent:

UNITED STATES PATENTS

| Number | Name | Date |
| --- | --- | --- |
| 1,828,692 | Townsend | Oct. 20, 1931 |
| 1,862,182 | Fraser | June 7, 1932 |
| 1,875,752 | Montero | Sept. 6, 1932 |
| 1,892,115 | McKee | Dec. 27, 1932 |
| 2,162,394 | Whiteley | June 13, 1939 |
| 2,164,377 | Bertossa | July 4, 1939 |
| 2,181,617 | Ashley | Nov. 28, 1939 |
| 2,263,098 | Mueller | Nov. 18, 1941 |
| 2,289,759 | Denise | July 14, 1942 |
| 2,307,356 | Birk | Jan. 5, 1943 |
| 2,329,473 | Landon | Sept. 4, 1943 |
| 2,386,115 | Holthouse | Oct. 2, 1945 |
| 2,401,330 | Breese | June 4, 1946 |